United States Patent [19]
Manabe et al.

[11] Patent Number: 4,668,479
[45] Date of Patent: * May 26, 1987

[54] PLASMA PROCESSING APPARATUS

[75] Inventors: Katsuhide Manabe; Yasuhiko Ogisu, both of Aichi, Japan

[73] Assignee: Toyoda Gosei Co., Ltd., Nishikasugai, Japan

[*] Notice: The portion of the term of this patent subsequent to Apr. 29, 2003 has been disclaimed.

[21] Appl. No.: 744,061

[22] Filed: Jun. 12, 1985

[30] Foreign Application Priority Data

| Jun. 12, 1984 | [JP] | Japan | 59-121122 |
|---|---|---|---|
| Jun. 25, 1984 | [JP] | Japan | 59-130622 |
| Jul. 19, 1984 | [JP] | Japan | 59-150233 |
| Jul. 19, 1984 | [JP] | Japan | 59-150234 |
| Jul. 19, 1984 | [JP] | Japan | 59-109073[U] |
| Jul. 23, 1984 | [JP] | Japan | 59-153596 |
| Jul. 23, 1984 | [JP] | Japan | 59-112153[U] |
| Jul. 23, 1984 | [JP] | Japan | 59-112154[U] |
| Jul. 31, 1984 | [JP] | Japan | 59-162323 |
| Oct. 30, 1984 | [JP] | Japan | 59-228494 |

[51] Int. Cl.$^4$ .................... B01J 19/08; C23C 16/00
[52] U.S. Cl. ..................... 422/186.05; 118/730; 118/732; 118/729; 118/715; 422/186.06; 422/186.07; 422/186.04; 422/906
[58] Field of Search ............... 118/730, 732, 729, 715; 422/906, 186.05, 186, 186.04, 186.07

[56] References Cited

U.S. PATENT DOCUMENTS 4,560,462 12/1985 Radford et al. ............ 204/192 R X
4,584,965 4/1986 Ogisu .................... 118/730

FOREIGN PATENT DOCUMENTS 34-86633 5/1959 Japan .

Primary Examiner—John F. Terapane
Assistant Examiner—Susan Wolffe
Attorney, Agent, or Firm—Cushman, Darby & Cushman

[57] ABSTRACT

The present invention relates to a plasma processing apparatus comprising a housing chamber which accommodates substances to be painted made of synthetic resin, a rotating support base which is provided in the housing chamber and rotates the substance to be painted, a plurality of hangers which are placed on the rotating support base and supports the substance to be painted, at least one plasma injection tube which is provided in the housing chamber and giving plasma processing to the surface of substance by injecting plasma gas thereto, and a variable speed drive means which rotates the rotating support base at the speed in accordance with a size and a number of substances to be painted.

39 Claims, 37 Drawing Figures

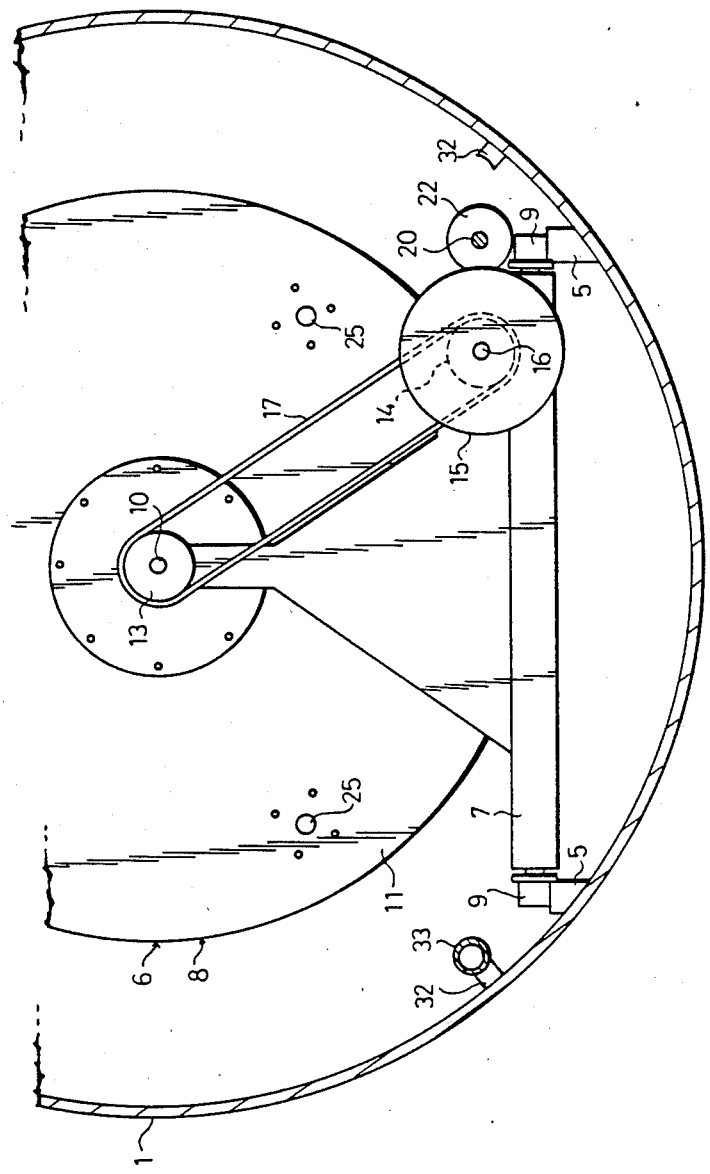

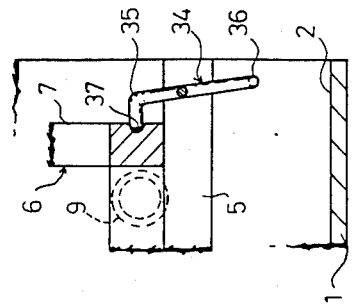
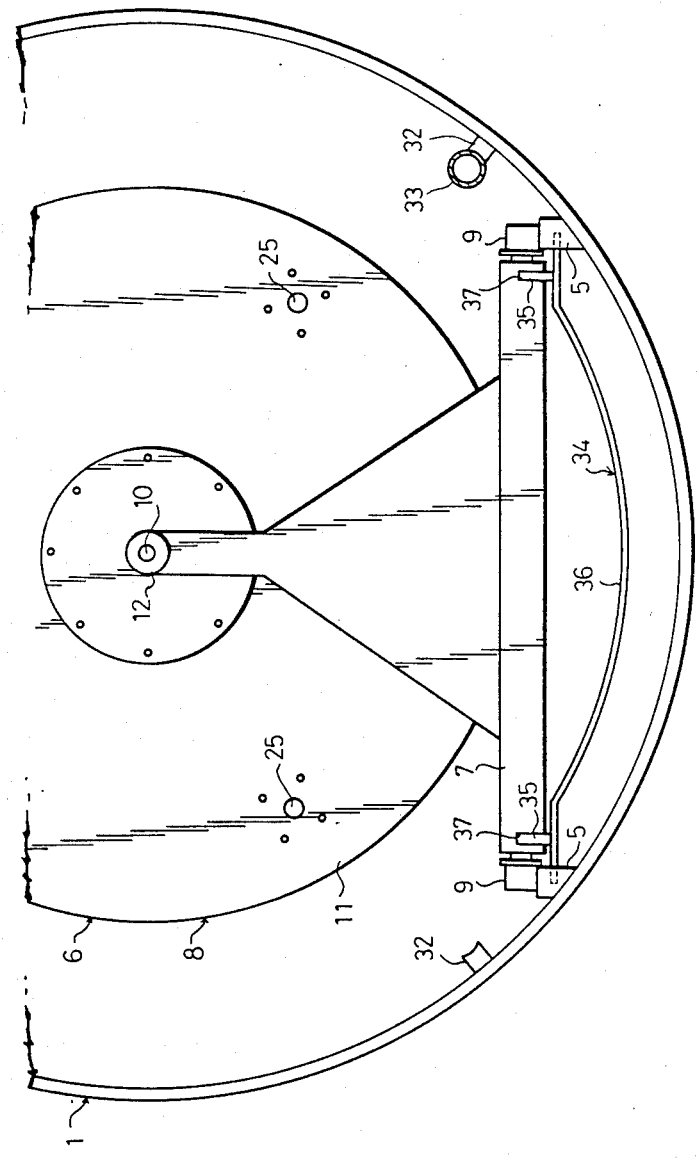

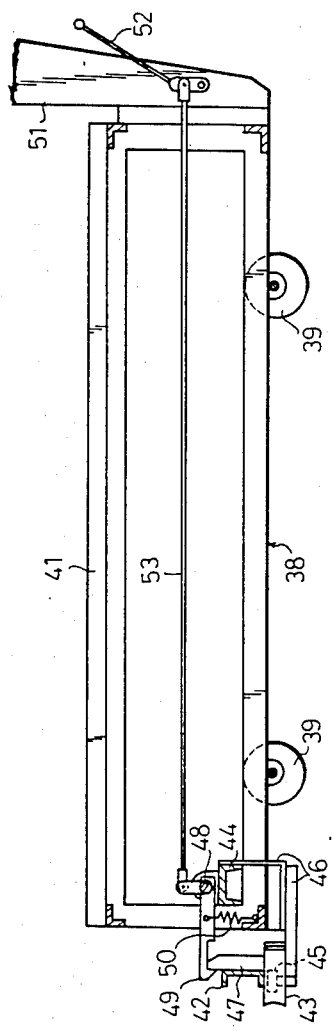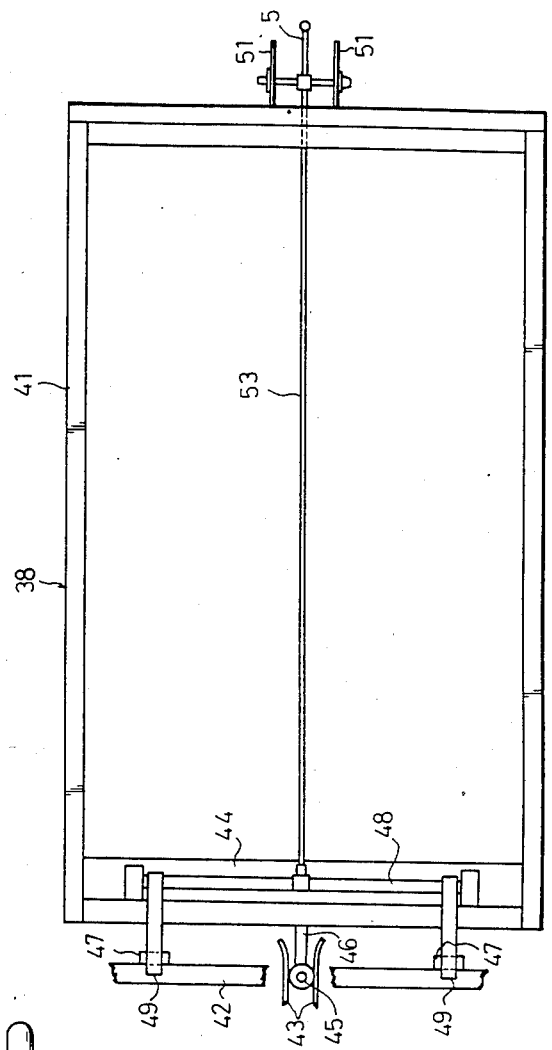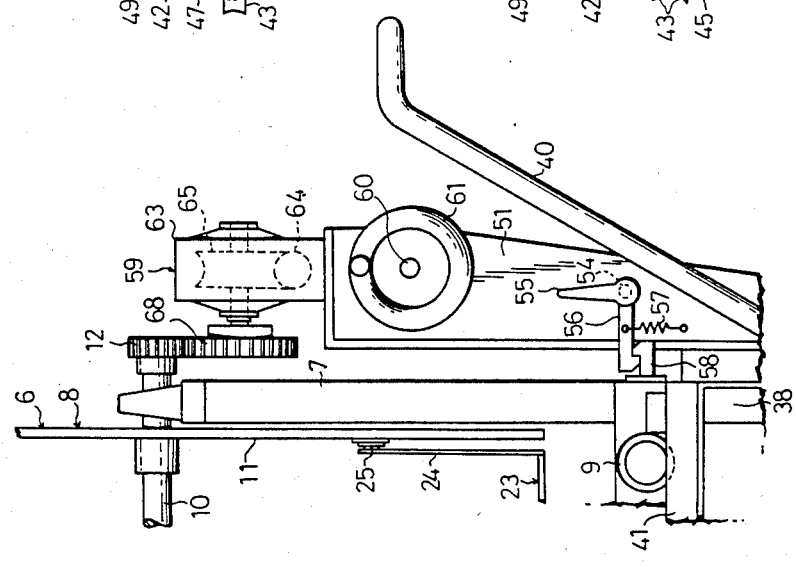

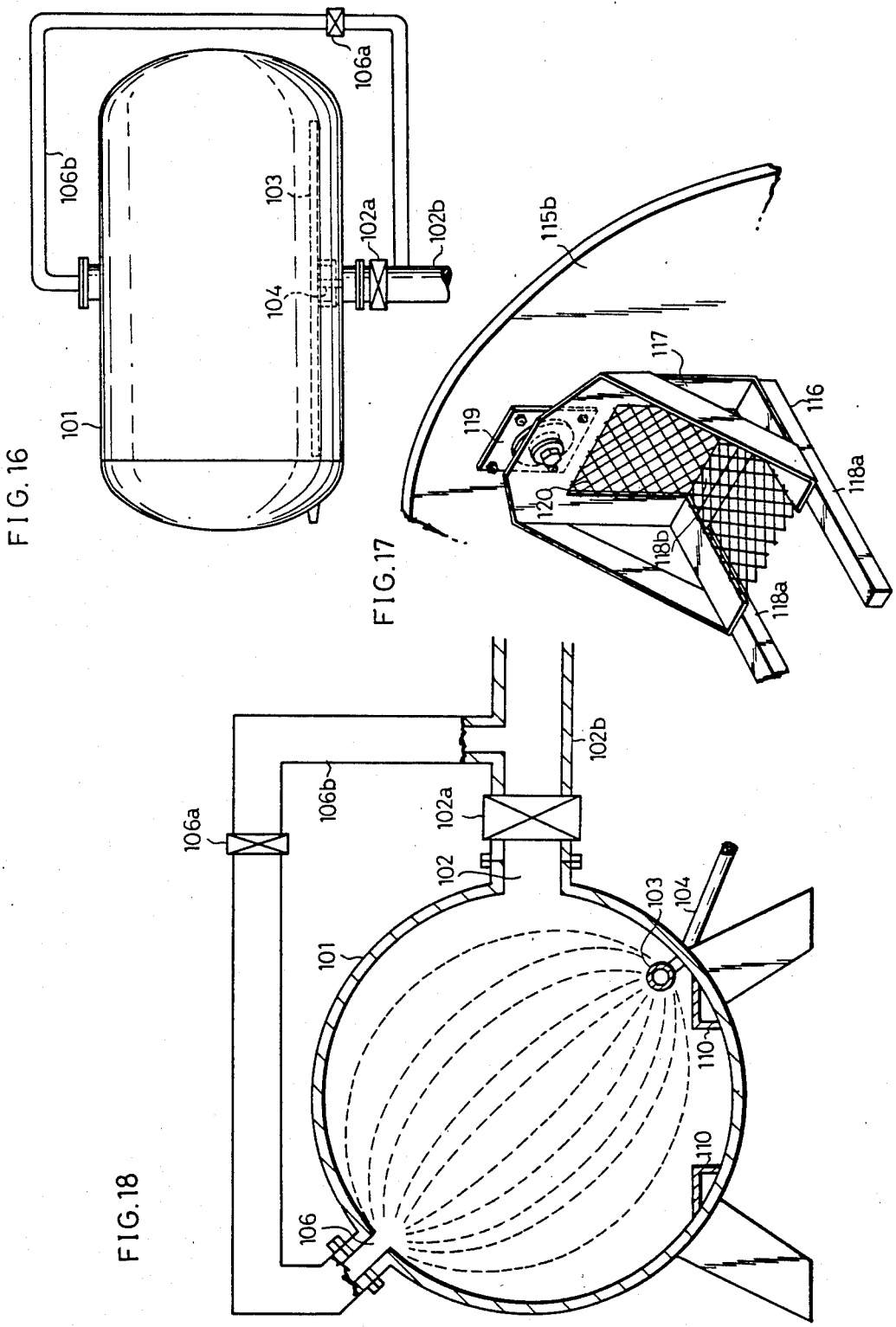

PLASMA PROCESSING APPARATUS

BACKGROUND OF THE INVENTION

Field of the Invention

The present invention relates to a plasma processing apparatus for giving plasma processing to the surface of substance to be painted such as a bumper of vehicle made of a synthetic resin.

As a plasma processing apparatus of this type, U.S. Pat. No. 4,584,965 discloses an apparatus wherein a rotating support base is rotated by a motor, etc. at a constant speed under the condition that the substances to be painted are supported by a plurality of hangers. This apparatus always assures the plasma processing under the same condition even in case a size, shape, surface area and the number of substances to be painted by plasma processing are changed. Therefore, for example, if the plasma processing is carried out to the substance to be painted having comparatively complicated shape by accommodating it within a tank in large numbers, a problem arises because the plasma is not uniformly applied to the entire part of a large number of substances to be painted and thereby the plasma processing is not carried out uniformly.

SUMMARY OF THE INVENTION

It is an object of the present invention to provide a plasma processing apparatus wherein plasma is uniformly extended to the entire part of a plurality of substances to be painted and plasma processing can be carried out uniformly even in case size and a number of substances to be painted have changed.

It is another object of the present invention to provide a plasma processing apparatus wherein a plurality of substances to be painted can be loaded or removed easily to/from a plurality of hangers on the rotating support base.

It is other object of the present invention to provide a plasma processing apparatus wherein a plurality of substances to be painted can be stably supported by the hangers.

It is further object of the present invention to provide a plasma processing apparatus wherein the surface of substances to be painted is not shielded by the hanger, the plasma can be spread effectively up to the end part of the substance to be painted and thereby uniform plasma processing can be carried out to the entire part of surface of substance to be painted even in case the plasma processing is executed to many large size substancess such as the bumpers of automobile housed within a chamber.

It is still further object of the present invention to provide a plasma processing apparatus wherein plasma gas is supplied sufficiently to the entire part of housing chamber, plasma processing can be realized very effectively and the processing time for substances to be painted can be curtailed.

It is still further object of the present invention to provide a plasma processing apparatus wherein generation of plasma by the plasma generating apparatus can be confirmed easily from the outside of plasma generating apparatus.

Other and further objects of the present invention will become obvious upon un understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

FIG. 3 is a partly enlarged transverse sectional view of the same processing apparatus.

FIG. 4 is a partly enlarged side elevation of a processing apparatus indicating the engagement constitution of a housing chamber and a rotating support base.

FIG. 5 is a partial longitudinal sectional view of FIG. 4.

FIG. 6 is a longitudinal sectional view of a truck indicating the positioning constitution and lock constitution of truck for the housing chamber.

FIG. 7 is a plan view of a truck.

FIG. 8 is a partly enlarged front elevation indicating the hooking constitution of rotating support base to the truck and rotating mechanism on the truck.

FIG. 16 is a plan view indicating the connecting system of an exhaust tube.

FIG. 17 is an enlarged perspective view indicating a part of the support base.

FIG. 18 shows flow of plasma gas when the plasma processing apparatus is used.

DETAILED DESCRIPTION OF THE PREFERRED EMBODIMENTS

A first embodiment of the plasma processing apparatus embodying the present invention is explained in detail in accordance with the accompanying drawings.

Figure 1:
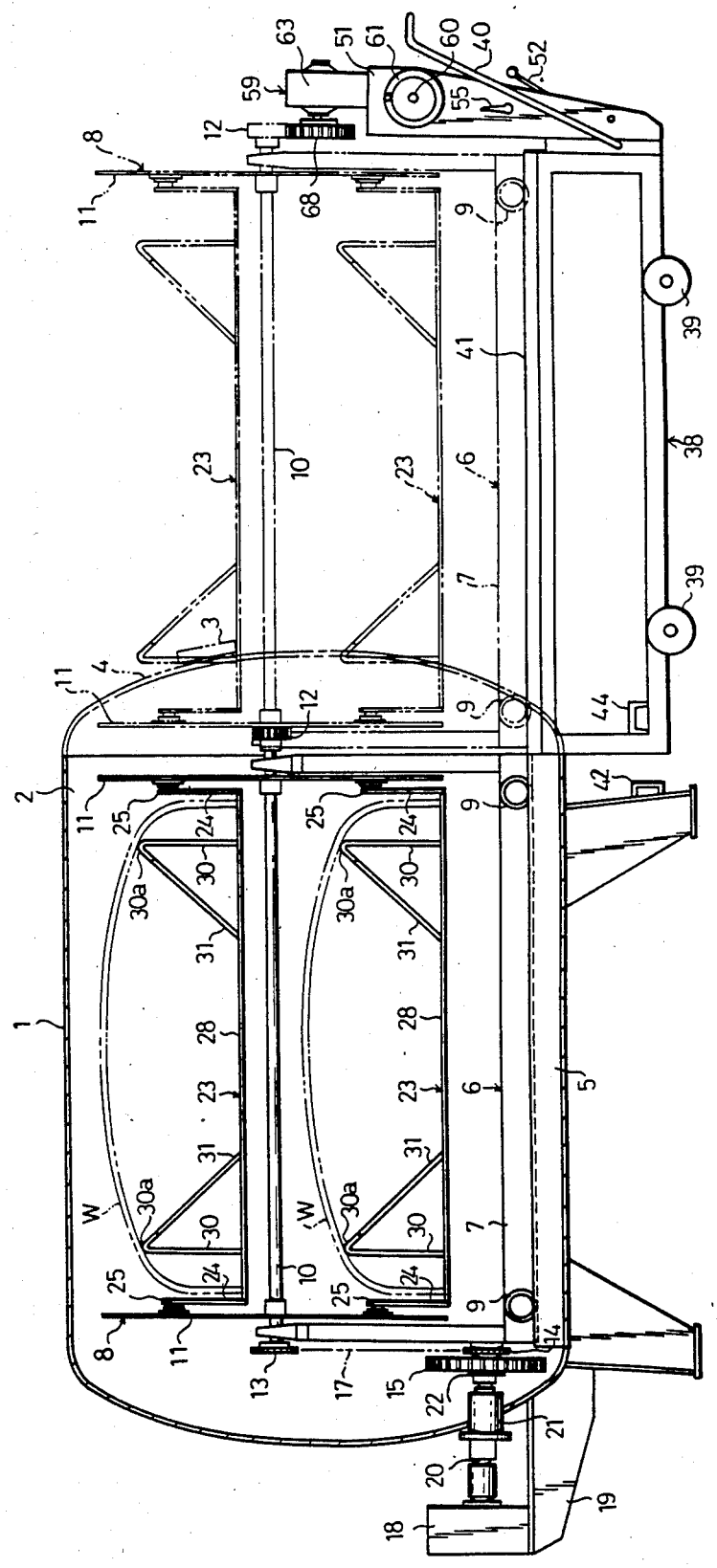
FIG. 1 is a longitudinal sectional view of a plasma processing apparatus embodying the present invention and a device for loading and removing substances to be painted to/from said apparatus.

A housing chamber 1 of plasma processing apparatus of this embodiment is provided with an entrance and exit 2 at the right side end as shown in FIG. 1 and this entrance and exit 2 is attached with a cover 4 having a plasma exhaust port 3 in such a way as it can be opened or closed. A pair of rails 5 are disposed with a constant interval at the bottom part of the housing chamber 1 and these rails are extending to the right and left for almost total length of such chamber 1.

Figure 2:
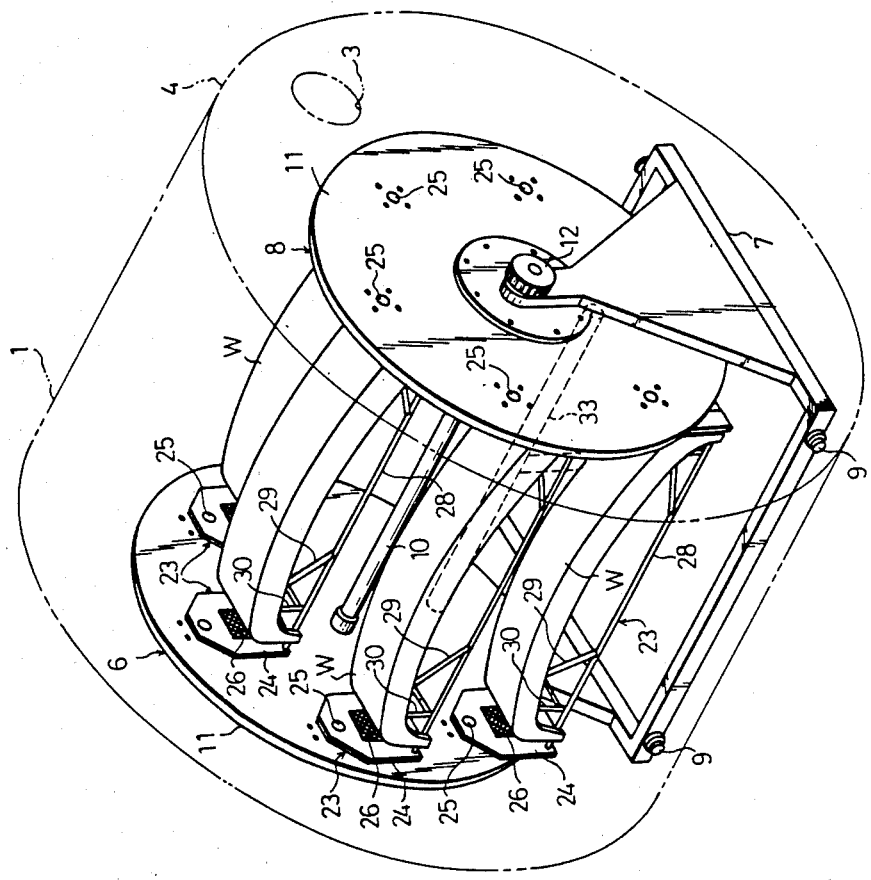
Fig. 2 is a perspective view of plasma processing apparatus.

A rotating support base 6 is movably supported on the rails 5 so that it can be input and output to/from said housing chamber 1. As shown in FIGS. 1 to 3, the rotating support base 6 is composed of a support frame 7 and a rotating body 8 supported rotatably around the horizontal axis on said support frame 7, and a plurality of wheels 9 which rotates along said rails 5 are rotatably provided at the lower part in both sides of the support frame 7. Said rotating body 8 is composed of a center rotating shaft 10 and a pair of right and left rotating disks 11 which are fixed to the area near the both ends of said rotating shaft 10.

As shown in FIGS. 1 to 3, at the outside of said support frame 7, a gear 12 is fixed to the left end of the rotating shaft 10, while a sprocket wheel 13 to the right end thereof. Corresponding to the sprocket wheel 13, the left side plate of support frame 7 rotatably supports a sprocket wheel 14 and a gear 15 with a shaft 16 and a chain 17 is extended over between both sprocket wheels 13, 14. At the outside of housing chamber 1 in the left side, a variable speed motor 18 is provided through a support plate 19 and a motor shaft 20 is protruded into the housing chamber 1 through a bearing cylinder 21. A gear 22 is fixed at the internal end of this motor shaft 20 and this gear 22 engages with or separated from the gear 15 on the support frame 7 in accordance with movement of the rotating support base 6 into/from the housing chamber 1.

Said motor 18 is a cone type variable speed motor which can change the speed continuously and comprises a drive means which can change the speed. With free adjustment of rotating speed of such variable speed motor 18, the rotating body 8 of rotating support base 6 can be rotated at the speed in accordance with a size and a number of substances to be processed for painting.

For instance, in the case of this embodiment, the rotating speed of rotating body 8 can be changed within the range of 6.5 to 20 rpm. In the case of a large size substance to be painted W like a bumper of automobile, a speed as low as 6.5 to 10 rpm is selected, and in the case of comparatively small size substance to be painted W, a speed as higher as 10 rpm or more is selected. Moreover, in case a number of times of plasma processings is low in a cycle of processing housed in the housing chamber, a high rotating speed is selected but in case a number of times of plasma processings is high, a low rotating speed is selected.

Figure 10:
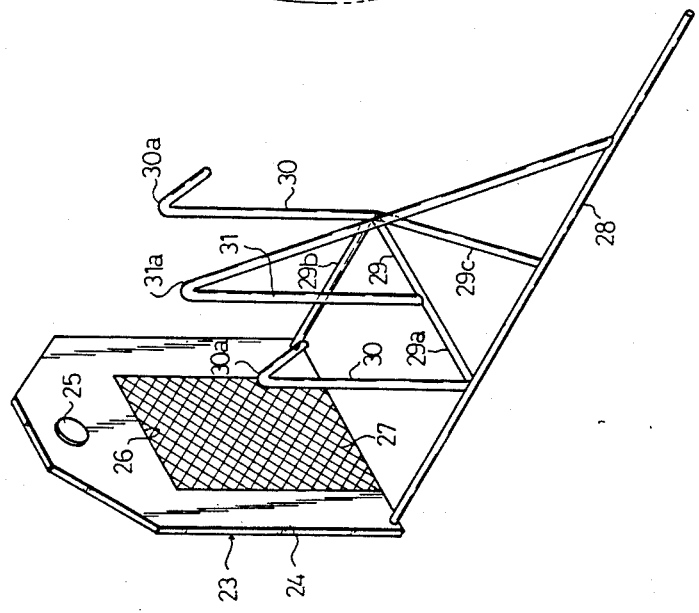
Fig. 10 is a partly enlarged perspective view of a hanger.

As shown in FIGS. 1, 2, 10, each hanger 23 is provided with a pair of side plates 24 as the support members at both right and left ends thereof and is supported at the upper end by a shaft 25 so that it can rotate relatively at the inside of rotating disk 11 of the rotating support base 6.

A cut-away window 26 is provided at the lower center of each side plate 24 and a net 27 which allows flow of plasma gas is extended at the cut-away window 26.

A coupling bar 28 consisting of a single bar material is bridged between front edges of lower part of said pair of right and left side plates 24. As shown in FIG. 10, both right and left edges of coupling bar 28 are respectively provided with a reinforcing frame 29 consisting of a support member 29a which extends backward from the coupling bar 28, a coupling member 29b which extends in lateral toward the area edge of lower end of side plate 24 from the rear end of such support member 29a, and a reinforcing member 29c which extends obliquely to the front side of internal side toward the coupling bar 28 from the rear end of said support member 29a.

On the support member 29a of such reinforcing frame 29, a pair of forward and backward edge support protruding segments 30 are protruded and at the upper end, a support member 30a for supporting, from the lower side, the substance W to be painted such as a bumper of automobile at the forward and backward both ends of the right and left ends of such substance is bent to the lower side at the internal side. Between such end support protruding segments 30, a center support protruding segments 31 is protruded on the support member 29a of the reinforcing frame 29 and at the upper end thereof, a support member 31a for supporting, from the lower side, the substance W to be painted at the center of front and rear sides of the right and left ends thereof is bent toward the lower part of internal side at the position higher than the support member 30a of said end support protruding segment 30 and the front end of such support member 31a is coupled to said coupling bar 28.

As shown in FIGS. 3 and 4, a plurality of support metals 32 are protruded, on a plurality of lines located with almost the equal angle interval in the circumferential direction (four lines located with an angle interval of 90 degrees in the embodiment) in such a way as opposing to the substance W to be painted, at the internal circumference of the housing chamber 1 and a plasma injection tube 33 having many injecting holes (not shown) at the external circumference thereof is supported by the support metals on a desired line or a plurality of lines. The plasma gas such as oxygen is thus injected into the housing chamber 1 from the injection hole of such plasma injection tube 33 and the surface of substance W to be painted in the hanger 23 is subjected to the plasma processing.

As shown in FIGS. 4 and 5, an engaging member 34 is rotatably supported between the rails 5 in the vicinity of the entrance and exit 2 in said housing chamber 1, engaging pawls 35 are protruded at the upper part of both ends thereof and a restorating part 36 is provided at the center thereof. Corresponding to both engaging pawls 35 of the engaging member 34, a pair of right and left engaging recessions 37 are formed at the lower end of the support frame 7 of the rotating support base 6 and when the rotating support base 6 moves along the rails 5 and enters the housing chamber 1, said both engaging pawls 35 of engaging member 34 respectively engage with the engaging recessions 37 and thereby the rotating support base 6 is engaged and stored in such a manner that it can be restored to the housing location.

As shown in FIGS. 1, 6 and 7, a truck 38 for carrying the rotating support base 6 is provided opposingly in the vicinity of entrance and exit 2 of said housing chamber 1. At the lower part of truck 38, a plurality of wheels 39 are rotatably provided and a carrying handle 40 is protruded at the right end part. A pair of forward and backward rails 41 extending to the right and left sides are provided in both sides of upper surface of the truck 38 and these are coupled with said rails 5 in the housing chamber 1, so that the wheels 9 in both sides of support frame 7 are guided and supported when the rotating support base 6 is moved into/from the housing chamber 1.

As shown in FIGS. 1, 6 and 7, a fitting member 42 extending forward and backward is extended and supported at the left side surface of leg part, and a pair of positioning plates 43 are opposingly provided with the specified interval at the lower surface of the center of such fitting member 42. Meanwhile, a fitting member 44 extending forward and backward is extended and supported at the lower left part of said truck 38 and an engaging roller 45 which can be engaged removably between said positioning plates 43 is supported through the support plate 46 at almost the center thereof. A positioning means is constituted by these positioning plates 43 and engaging roller 45. When the truck 38 is moved to the entrance 2 of the housing chamber 1, the engaging roller 45 enters between both positioning plates 43 and engages therewith. Thereby, the truck 38 is positioned at the specified location against the housing chamber 1.

As shown in FIGS. 6 and 7, a pair of forward and backward fixing lock pawls 47 are provided on the fitting member 42 in the side of said housing chamber 1. A rotating shaft 48 is rotatably supported on a fitting member 44 in the side of truck 38 and a pair of rock pawls 49 which is engaged removably with the fixing lock pawls 47 are respectively fixed at both ends of said rotating shaft 48. A lock means is constituted by this fixing lock pawls 47 and the movable lock pawls 49. When the truck 38 is disposed opposing to the housing chamber 1, the movable lock pawls 49 are engaged with the fixing lock pawls 47 by the effect of a spring 50 and thereby the truck 38 is locked for the housing chamber 1. Moreover, a restoration lever 52 is rotatably supported between a pair of fitting plates 51 for operation protruded at almost the center of the right side of truck 38 and the movable lock pawls 49 are restored and rotated by the rotating operation of this restoration lever 52 through the coupling bar 53.

Figure 9:
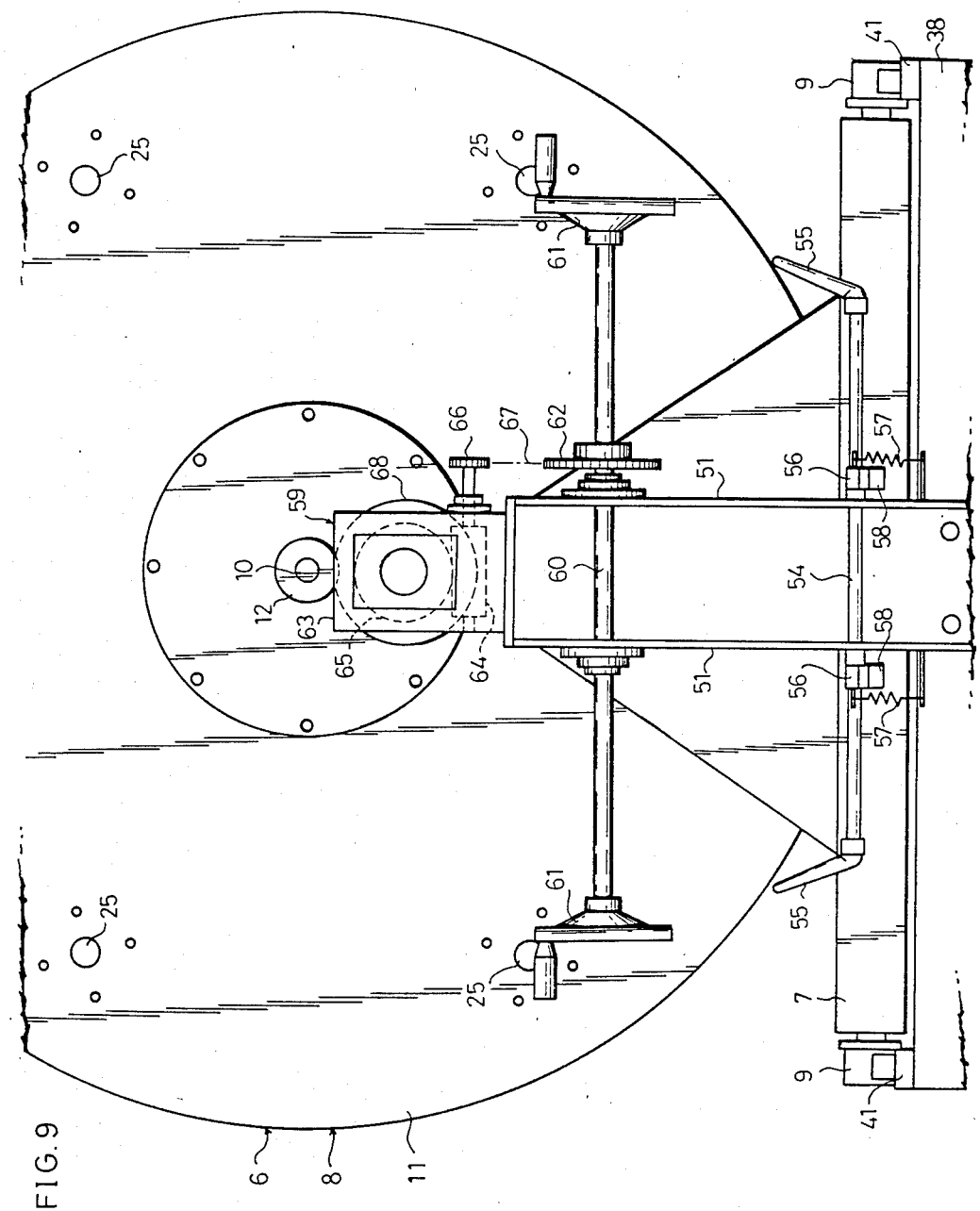
FIG. 9 is a part of the side elevation.

As shown in FIGS. 1, 8 and 9, a rotating shaft 54 is rotatably supported through the fitting plates 51 for operation at the upper part of said restoration lever 52 and the operation levers 55 for restoration are respectively provided at both front and rear sides (right and left in FIG. 9). At both front and rear sides of said fitting plates 51, the movable engaging pawls 56 are respectively fixed to the rotating shaft 54 and this rotating shaft 54 is rotatably energized counterclockwise in FIG. 8 by the effect of springs 57. A pair of front and rear fixed engaging pawls 58 are protruded at the right side of support frame 7 of rotating support base 6 in such a way as constituting an engaging means with both movable engaging pawls 56 and when the rotating support base 6 is pulled on the truck 38, these fixed engaging pawls 58 are restoratingly engaged with the movable engaging pawls 56 and thereby the rotating support base 6 is unmovably placed and held on the truck 38.

Moreover, a rotating mechanism 59 for manually rotating a rotating body 8 for loading and removal of the subtance W to be painted against the hanger 23 is provided at the upper part of said fitting plate 51 for operation in such a manner that it is operated and connected with the rotating body 8 of the rotating support base 6 placed on the truck 38.

Namely, an operating shaft 60 is rotatably provided through the fitting plates 51 at the upper part of said rotating shaft 54 and the operation handles 61 are respectively provided at both front and rear ends of such operating shaft 60. The sprocket wheel 62 is fixed on the operating shaft 60 at the rear side of fitting plate 51 and it is rotated by rotation of the operation handle 61. At the upper end between the fitting plates 51, a worm reduction mechanism 63 is disposed and the worm 64 and worm gear 65 engaging each other are provided at the inside thereof.

At an external end of worm shaft of said worm 64, a sprocket wheel 66 is fixed and a chain 67 is extended between this sprocket wheel 66 and sprocket wheel 62 on said operation shaft 60. At an external end of gear shaft of worm gear 65, a transmission gear 68 is fixed and when said rotating support base 6 is pulled on the truck 38, such transmission gear 68 separably engages with the gear 12 provided at the front end of rotating shaft 10 of the rotating body 8, coupling the rotating body 8 and rotating mechanism 59 for operation.

In the plasma processing apparatus thus constituted as explained above, in case a comparatively small substance W to be painted is housed in large number in the housing chamber 1 for plasma processing, the plasma gas injected from the plasma injection tube 33 is effectively stirred by high speed rotation of rotating body 8 by setting the rotating speed of rotating body 8 of rotating support base 6 to the speed as high as 20 rpm through adjustment of rotating speed of variable speed motor 18, and thereby plasma gas is uniformly supplied to the entire part of substances W to be processed in large number and uniform plasma processing can be carried out.

The lower surface of the substance W to be painted placed on the hanger 23 is engaged with the upper end supports 30a, 31a of a plurality of support protruding segments 30, 31 provided on the reinforcing bars 29 at both ends of coupling bar 28 and thereby the substance W to be painted is stably supported from the lower side on the hanger 23. Under this condition, there is no any shielding material on the surface of substance W to be painted, and therefore the plasma gas injected from the plasma injection tube 33 is uniformly and effectively supplied to the substance W and uniform plasma processing is carried out uniformly to the entire part of surface of the substance W.

Then, operation for loading or removing substance W to be painted to/from the hanger 23 on the rotating support base 6 is explained hereunder.

The substance W to be painted can be loaded and removed in the following manner. As shown in FIG. 1, with the cover 4 of housing chamber 1 opened, the truck 38 is provided opposingly to entrance 2 of housing chamber 1. Thereby, as shown in FIGS. 6, 7, an engaging roller 45 of positioning means engages between the positioning plates 43, positioning the truck 38 to the specified location against the housing chamber 1 and the moving lock pawls 49 of lock means engage with the fixing lock pawls 47, locking the truck 38 against the housing chamber 1. Under this condition, the rails 41 of the truck 38 are extended and coupled with the rails 5 in the housing chamber 1.

Thereafter, the engaging pawls 35 of the engaging members 34 shown in FIGS. 4 and 5 is separated from the engaging recessions 37, restoring engagement between the housing chamber 1 and the rotating support base 6. When the rotating support base 6 is pulled to the outside from the entrance and exit 2 of the housing chamber 1 under this condition, the rotating support base 6 is moved on the truck 38 along the rails 5 and 41 as indicated by the chain line in FIG. 1. Thereby, a gear 15 provided at the left side of support frame 7 of the rotating support base 6 is separated from a gear 22 on the motor shaft 20 in the side of housing chamber 1 and a gear 12 provided at the right side of support frame 7 is engaged with a transmission gear 68 in the side of truck 38 and thereby the rotating body 8 of rotating support base 6 is coupled to the rotating mechanism 59 on the truck 38. In this case, the fixed engaging pawl 58 of engaging means shown in FIGS. 8 and 9 engages with the movable engaging pawl 56 and the support frame 7 of rotating support base 6 is engaged and held on the truck 38.

When the rotating body 8 of rotating support base is rotated at the desired angular position through the worm reduction mechanism 63 by the rotation of operation handle 61 under this condition, the rotating body 8 is stationarily kept at said angular position based on engagement between worm 64 and worm gear 65 in the worm reduction mechanism 63, without relation to change of weight balance of the rotating body 8. Accordingly, the substance W to be painted can be loaded or unloaded easily within a short period of time to/from a plurality of hangers 23 while the rotating body 8 is gradually rotated for every specified angle with the operation handle 61.

In this embodiment, since the operation handle 61 of the rotating mechanism 59 and the operation lever 55 for restoration of engaging means are respectively provided to the front and rear sides of the fitting plate 51 on the truck 38, the substances W to be painted for the hangers 23 can be loaded and unloaded very easily at any desired position of front and rear sides of the truck 38.

The first preferred embodiment of the present invention is not limited only to said constitution and for example, a brake motor comprising the brake may be used as a rotating mechanism for rotating the rotating support base 6, or a drive means which can change the speed may be constituted by a motor which rotates at a constant speed and a continuous variable speed gear which transmits rotation of motor to the rotating support base through change of speed, or a support member 24 in the form of plate, bar, net or lattice may be used.

The second preferred embodiment of the present invention is explained with reference to FIGS. 11 to 18.

Figure 11:
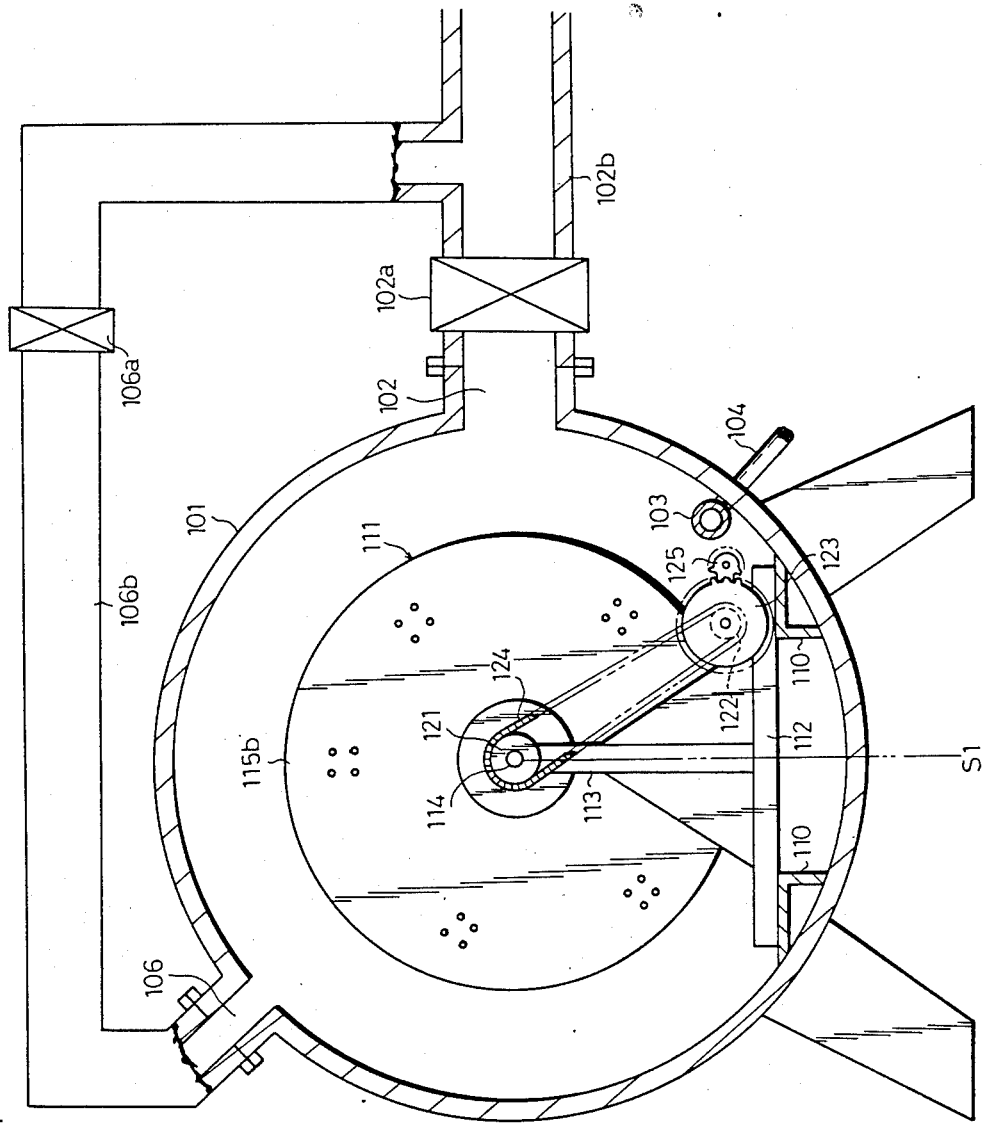
FIG. 11 is a part of sectional view indicating a plasma processing apparatus as the second embodiment of the present invention.

The housing chamber 101 which may be sealed of the plasma processing apparatus is formed like a hollow cylinder and in FIG. 11, the front wall thereof is provided with a door (not shown) which for opening or closing the housing chamber 101. In FIG. 11, a first exhaust port 102, which is only used for reducing an internal pressure of said housing chamber 101, is provided at the right side center of wall. Said exhaust port 102 is fitted with an exhaust pipe 102b having a valve 102a for flow reduction control.

The lower part of said exhaust port 102 is provided with a stainless plasma injection tube 103 for injecting plasma gas such as oxygen.

Figure 13:
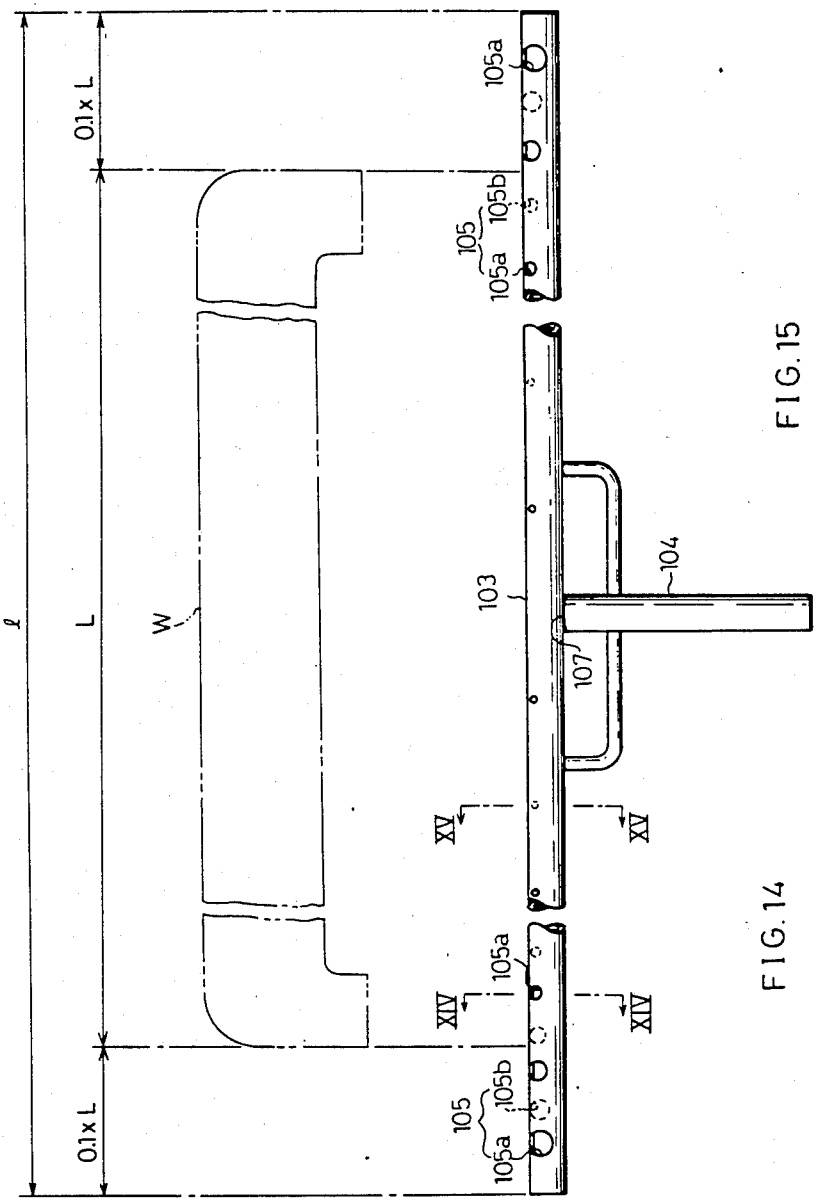
FIG. 13 is a front elevation of a plasma injection tube.

As shown in FIG. 13, the plasma injection tube 103 is so formed that the total length l is longer than the total length L of substance W to be painted at both ends respectively by about 10%. Namely, total length l of injection tube 103 can be indicated by the following equation.

$l = L + 2 \times 0.1 L$

Figure 14:
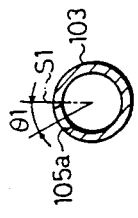
FIG. 14 is a sectional view along the line XIV—VIV in FIG. 13.
Figure 15:
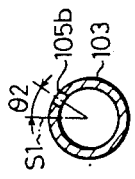
FIG. 15 is a sectional view along the line XV—XV in FIG. 13.

As shown in FIGS. 13 to 15, a plasma introducing port 107 formed at almost the center of said injection tube 103 is connected with an introducing tube 104 and the end part thereof is connected to a plasma supply apparatus (not shown) located at the outside of housing chamber 101. Many injection holes 105 where layout interval is gradually reduced toward the end part of injection tube 103 and internal diameter gradually increases are formed at the external circumference of injection tube 103 at both sides of plasma introducing port 107. The injection holes 105 include those 105a which are opening in the direction as inclining by the specified angle of $\theta_1$ (30 degrees in this embodiment) to the front side for the vertical plane S1 and those 105b which are opening in the direction as inclining by the specified angle of $\theta_2$ (30 degrees in this embodiment) to the rear side for said vertical plane. The injection holes 105a inclining to the front side and those 105b inclining to the rear side are disposed alternately.

A number of injection holes 105 in the side of the exhaust port 102 from the introducing tube 104 namely in the right side is set less than the number of injection holes in the left side from the exhaust port 102 by 15%.

Moreover, a second exhaust port 106 is formed in smaller diameter than the first exhaust port 102 at the wall of housing chamber 101 opposing to said injection tube 103 with an angle of about 180°. Said exhaust port 106 is provided with an exhaust tube 106b having a valve 106a for controlling flow rate and the other end thereof is connected to said exhaust tube 102b. Namely, as shown in FIG. 16, said exhaust tube 106b is a bypass tube of the exhaust tube 102b.

Then, positional relation between the plasma injection tube 103 and a second exhaust port 106 in this embodiment will be explained. In FIG. 11, the plasma injection tube 103 is provided at the location rotated counterclockwise by 30° from the vertical plane S1 for the bottom of said housing chamber 101 and the second exhaust port 106 is formed at the location rotated counterclockwise by 210° from the same vertical plane S1.

Figure 12:
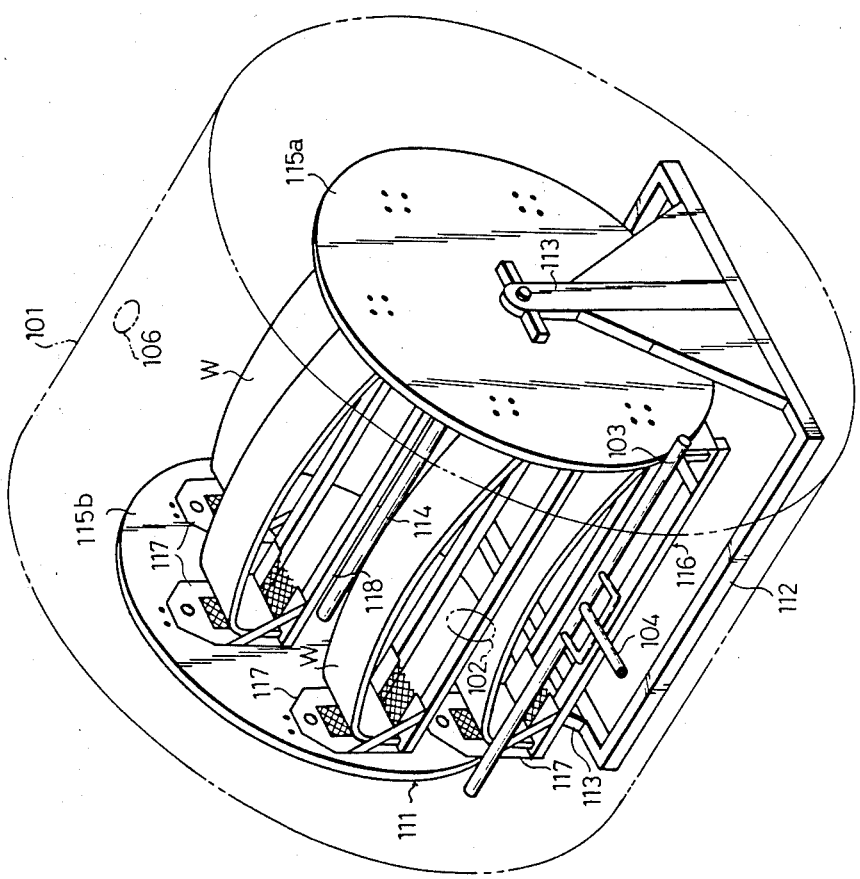
FIG. 12 is a perspective view of FIG. 11.

A pedestal 110 is provided at the bottom part of housing chamber 101 in the lower side of said injection tube 103 and a rotating apparatus 111 explained below is provided at the upper part of said pedestal 110. Said rotating apparatus 111 is supported by a frame 112 in the form of square frame having the slidable mechanism (not shown) as shown in FIG. 12 and a pair of poles 113 provided in both sides of said frame 112. Mainly, it is constituted by a rotating shaft 114 rotatably supported at the upper ends of said both poles 113 and a pair of support disks 115a and 115b fixed in the vicinity of such rotating shaft 114. Total of six support bases 116 for supporting substances W to be painted are disposed with an adequate angular interval between internal surfaces of said both support disks 115a and 115b.

As shown in FIG. 17, each support base 116 is constituted by a pair of support pieces 117 formed by bending a metal plate, an extended bars 118a extended between both support pieces 117 and a coupling bars 118b provided at the lower surface of support pieces 117 in order to connect both ends of each extended bars 118a, and each support piece 117 is supported rotatable in relative to the support disks 115a and 115b at the upper end thereof by a metal 119. Therefore, each support base 116 is held horizontally while said rotating shaft 114 and support disks 115a and 115b are rotating and not rotated. Moreover, a net 120 which permits plasma gas to pass therethrough is extended to the cut-away part at the center of each support piece 117.

In FIG. 11, moreover, a sprocket wheel 121 is engaged with the front side end of said rotating shaft 114, a sprocket wheel 122 and a transmission gear 123 which rotate around an axis line are provided on said frame 112, a chain 124 is extended between the sprocket wheels 121 and 122, and said transmission gear 123 is engaged with a drive gear 125 which is rotatably driven by a drive motor not shown.

With rotation of drive gear 125, the support disks 115a and 115b are rotated together with a rotating shaft 114 through the transmission gear 123, sprocket wheel 122, chain 124 and sprocket wheel 121.

Here, operations of this apparatus are explained. First, the door of said housing chamber 101 is opened, said rotating apparatus 111 is slid to the outside of housing chamber 101 together with the frame 112 and the substances W to be subjected to plasma processing are placed on said support base 116.

Next, said rotating apparatus 111 is slid again into the housing chamber 101 and the door is closed. Then, said flow speed control valve 102a is opened and inside pressure of housing chamber 101 is reduced (a reducing apparatus is not shown) to the specified pressure (about 0.5 to 0.6 Torr). When the pressure reaches the specified value, said valve 102a is closed and the drive motor of said rotating apparatus 111 is operated. Thereby, the rotating shaft 114 and support disk 115 are rotated through the drive gear 125, transmission gear 123, sprocket wheel 122, chain 124 and sprocket wheel 121, and while the support base 116 is relatively rotating around the upper end thereof against the support disk 115 together with the substance W to be painted, this substance W is kept horizontally even during rotation of support disk 115.

Simultaneously with the drive of said rotating apparatus 111, plasma gas such as oxygen is supplied to the injection tube 103 through said introducing tube 104. Thereby, the plasma gas is injected in such a way as surrounding a plurality of substances W up to the end part thereof, the plasma gas is spread to the entire part in the housing chamber 101, and the surface of a plurality of substances W which make revolution while they are rotating by themselves within the housing chamber can be uniformly activated because the injection tube 103 is formed longer than the total length of substances W at both ends by 10% and the injection holes 105 are formed with an inclination to the front side or rear side of about 30° against the vertical plane S1.

According to the experiments, it is desirable to select the angles $\theta_1$, $\theta_2$ to 25 to 35 degrees. If this angle is larger or smaller than such value, plasma processing is insufficient and contact angle (an alternative value of surface tension) of the substance W not painted increases.

Moreover, in this embodiment, since a number of injection holes 105 in the side of exhaust port 102 than the introducing tube 104, namely in the right side is set less than the number of injection holes 105 in the left side by 15%, the plasma gas flow toward said exhaust port 102 is not biased and the gas flows uniformly and more uniform plasma processing can be applied to the substances W to be painted.

In addition, the flow speed control valve 106a is adjusted in accordance with amount of plasma gas injected and thereby the exhaust rate at the second exhaust port 106 is set lower than the speading speed of supply gas and an internal pressure of said housing chamber 101 is kept constant.

In this case, since diameter of the second exhaust port 106 is smaller than the diameter of the first exhaust port 102, the exhaust rate becomes low as compared with the exhaust rate when only the first exhaust port 102 is opened. Moreover, since said exhaust rate can be fine-adjusted with said control valve 106a, the plasma gas can be uniformly spread within the housing chamber 101.

Moreover, since said exhaust port 106 is provided at the location opposing to said plasma injection tube 103 by about 180°, flow of plasma gas spead like shower from the injection holes 105 can be indicated by the broken line in FIG. 18. This figure indicates that the plasma gas sufficiently spread in the entire part of said housing chamber 101, converged to the second exhaust port 106 and is then exhausted. Therefore, the plasma gas is efficiently injected to the surface of substance W to be painted and effectively activates the entire part of surface.

The speading condition of plasma gas in the housing chamber 101 can be set to the condition most suited to the shape and number of substances W to be painted by adjusting the rate of exhaust gas and thereby plasma processing efficiency can be remarkably improved and the processing time can also be curtailed.

Since the exhaust tube 106b fitted to the second exhaust port 106 is used as the bypass tube of first exhaust tube 102b, only one pressure reduction apparatus is required and the plasma processing apparatus itself can be designed compact.

For example, the invention of the second embodiment can be embodied as explained below.

1. Said exhaust port 106 is not limited only to the position opposing to said injection tube 103 and may be provided to the position where the plasma which is formed like shower is converged after it is spread effectively in the housing chamber 101. For example, it may be provided at the position within 45° in the upper and lower direction from the position opposing to the injection tube 103.

Figure 19:
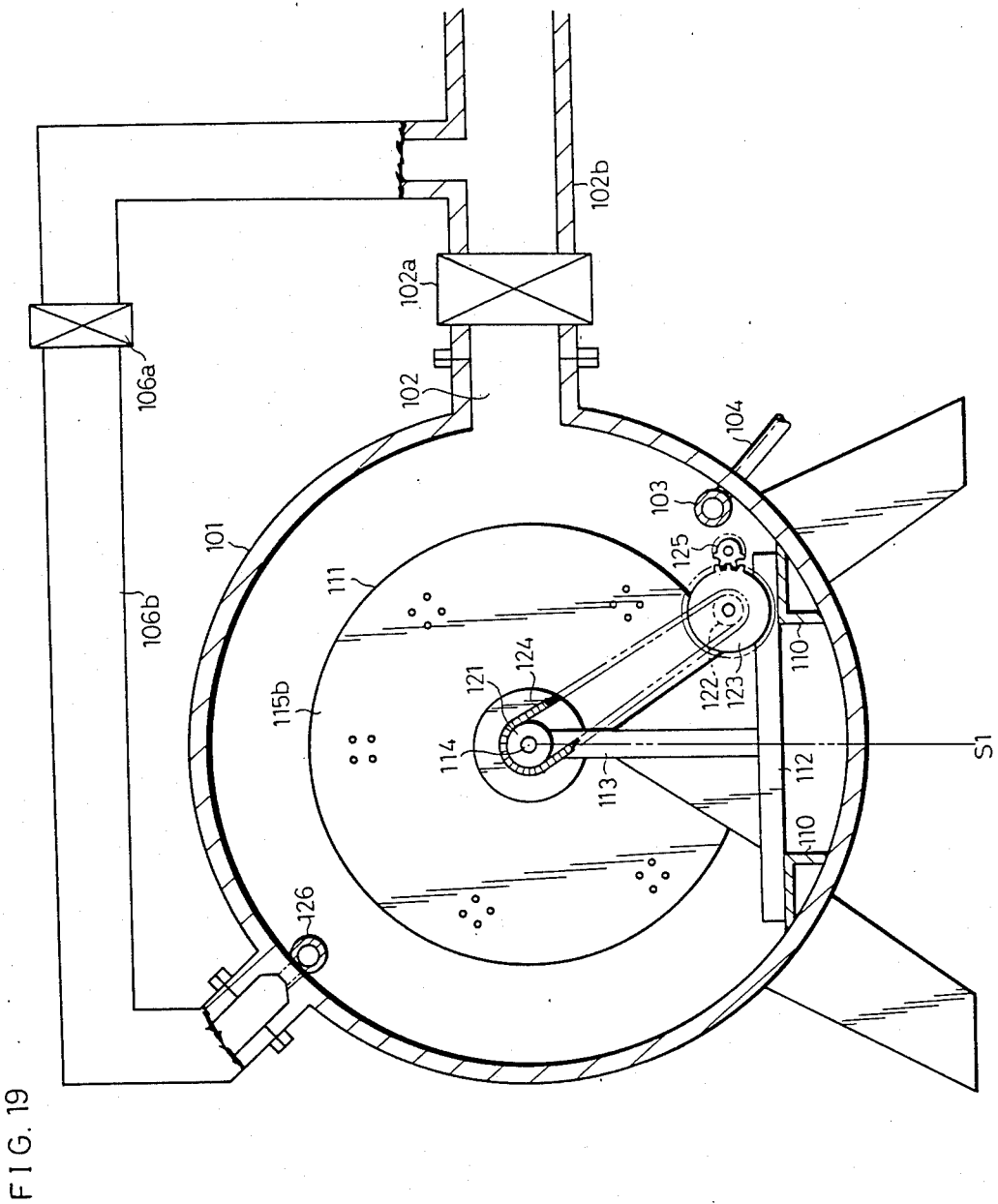
FIG. 19 is a part of sectional view indicating another example of the second embodiment.

2. The plasma gas injected from the injection tube 103 is absorbed and exhausted more uniformly than it is absorbed and injected from only one hole by providing the exhaust tube 126 having the same structure as said injection tube 103 to said exhaust port 106 as shown in FIG. 19.

3. In the case of exhausting plasma gas, the gas can be exhausted not only from the second exhaust port 106 but also from both first and second exhaust ports by adjusting the flow rate control valve 102a of the first exhaust port 102.

4. Said second exhaust port 106 can be used together with the first exhaust port 102 by reducing the pressure in the housing chamber 101.

Figure 20:
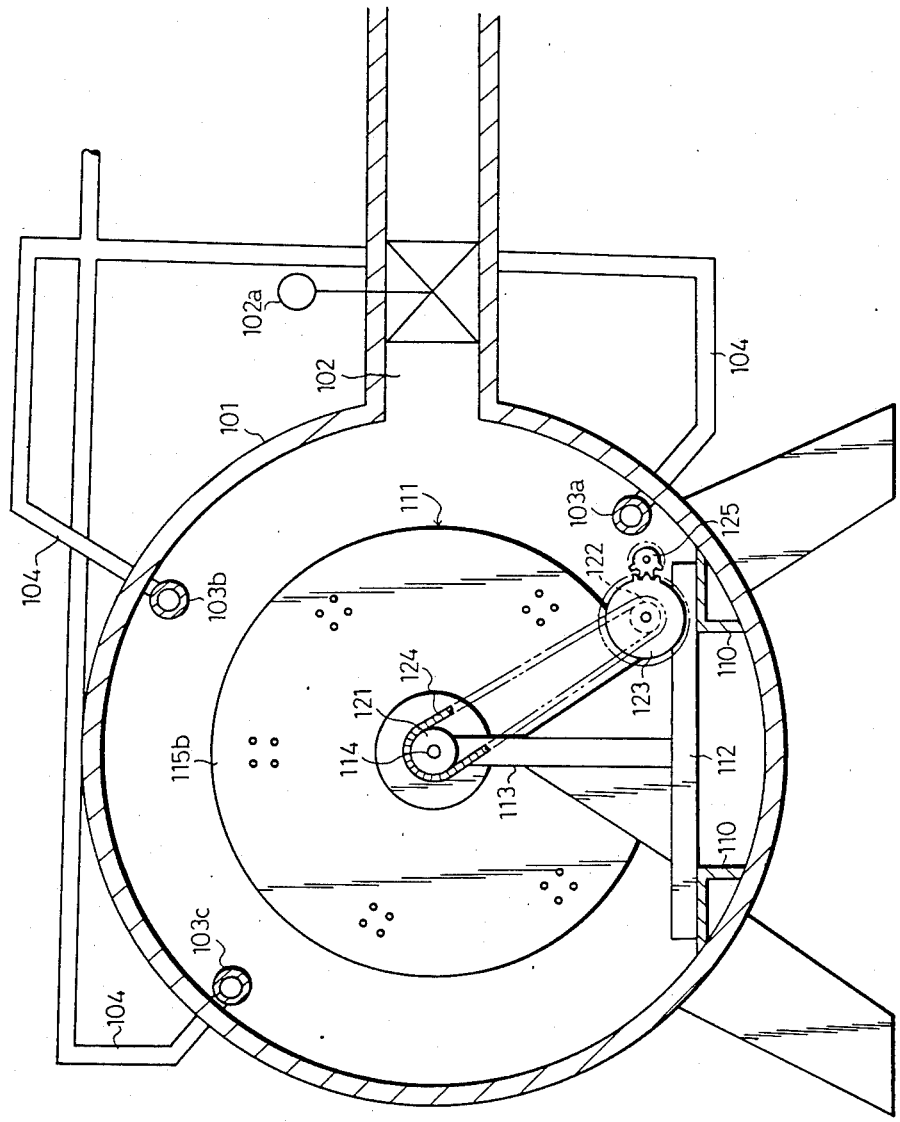
FIG. 20 is a sectional view indicating a plasma processing apparatus of the third embodiment of the present invention.
Figure 21:
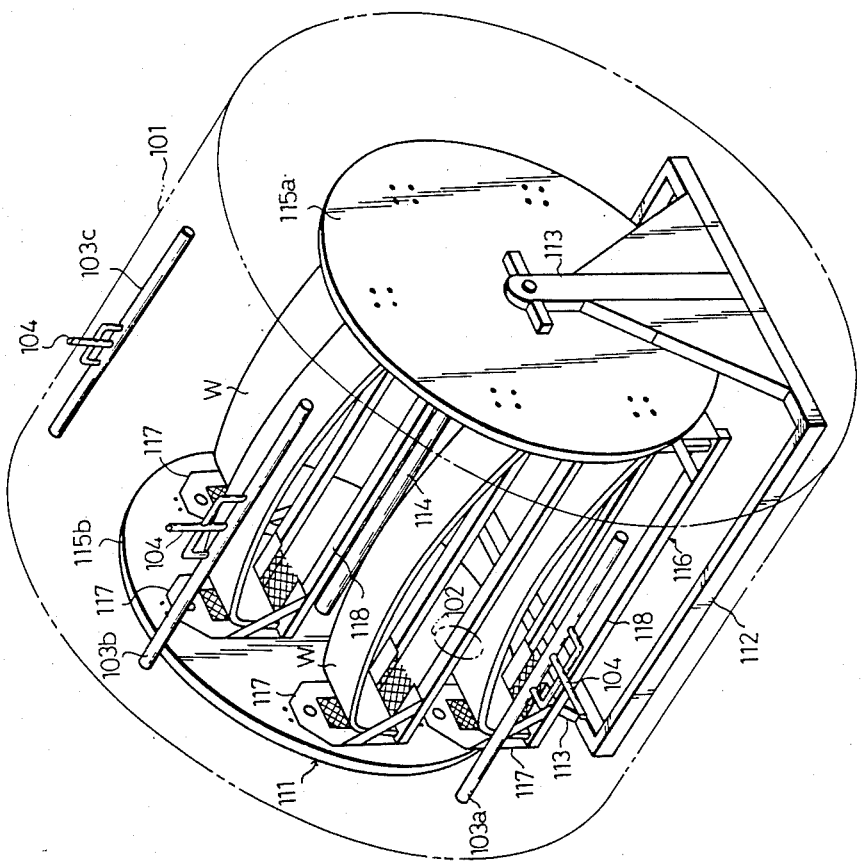
FIG. 21 is a perspective view of FIG. 20.

Next, difference of the third embodiment of the present invention from the second embodiment will be explained hereunder with reference to FIGS. 20 and 21.

An exhaust port 102 for reducing internal pressure of said housing chamber 101 is formed at the center of right side wall of sealed housing chamber 101 of plasma processing apparatus and has a valve 102a. At the lower internal surface of said exhaust port 102, a first stainless plasma injection tube 103a for injecting the plasma gas such as oxygen is provided extending to the axial center of the housing chamber 101. A second injection tube 103b is also provided in the same way at the position rotated counterclockwise by 90° around the center of housing chamber 1 from the position of said first injection tube 103a and moreover a third injection tube 103c is provided in the same way at the position further rotated counterclockwise by 90°.

Three injection tubes 103a, 103b and 103c are formed in the same shape as the plasma injection tube 103 of the second embodiment of the present invention.

The positional relation between these three injection tubes 103a, 103b and 103c is as follow. Namely the injection tubes 103a, 103b and 103c are provided almost in parallel to the axial center of the housing chamber 101 and provided at the internal surface of housing chamber 101. The plasma introducing port (not shown) formed almost at the center of said injection tubes 103a, 103b and 103c is connected with an introducing tube 104 and its end is connected to the plasma supply apparatus (not shown) in the outside of the housing chamber 101.

The effect and advantages are explained below. As in the case of the second embodiment, said rotating apparatus 111 is driven. Simultaneously, when the plasma gas such as oxygen is supplied to the injection tubes 103a, 103b and 103c through said introducing tube 104, the plasma gas is uniformly injected from the injection holes 105. Moreover, the valve 102a of exhaust port 102 reduces a little the internal pressure of housing chamber 101 when it is opened a little, preventing increase of pressure in the housing chamber 101 to be generated by supply of plasma gas and keeping it to the specified value.

In this case, since the plasma gas is simultaneously injected from the injection holes 105 of three injection tubes 103a, 103b and 103c, the plasma gas can be spreaded uniformly which a fantastically short period of time to the entire part of the housing chamber 101 as compared with the injection only from a single injection tube 103a.

Moreover, since said injection tubes 103a, 103b, and 103c are provided at the internal wall of housing chamber 101 in parallel each other on the same internal circumference, the plasma gas is directly injected for three times to the substance W to be painted while it makes a turn around said rotating shaft 114, efficiency of the plasma processing can be improved and the processing time can also be curtailed to about ⅓ to ½.

The invention of the third embodiment can also be embodied as explained below.

1. Another injection tube is provided at the position rotated counterclockwise by 90° from said injection tube 103c.

2. Length of said injection tubes 103a, 103b, and 103c is set further longer than the length of substance W not painted by about 10% at both ends thereof.

3. Shape and arrangement of said injection holes 105 are not limited only to those of this embodiment. For example, the sectional view of injection hole 105 may be formed circular and said specified angles $\theta_1$ and $\theta_2$ in the arrangement may be set freely within the range of 0° to 60°.

Then, the fourth embodiment of the present invention is explained with reference to FIGS. 22 and 23.

Figure 22:
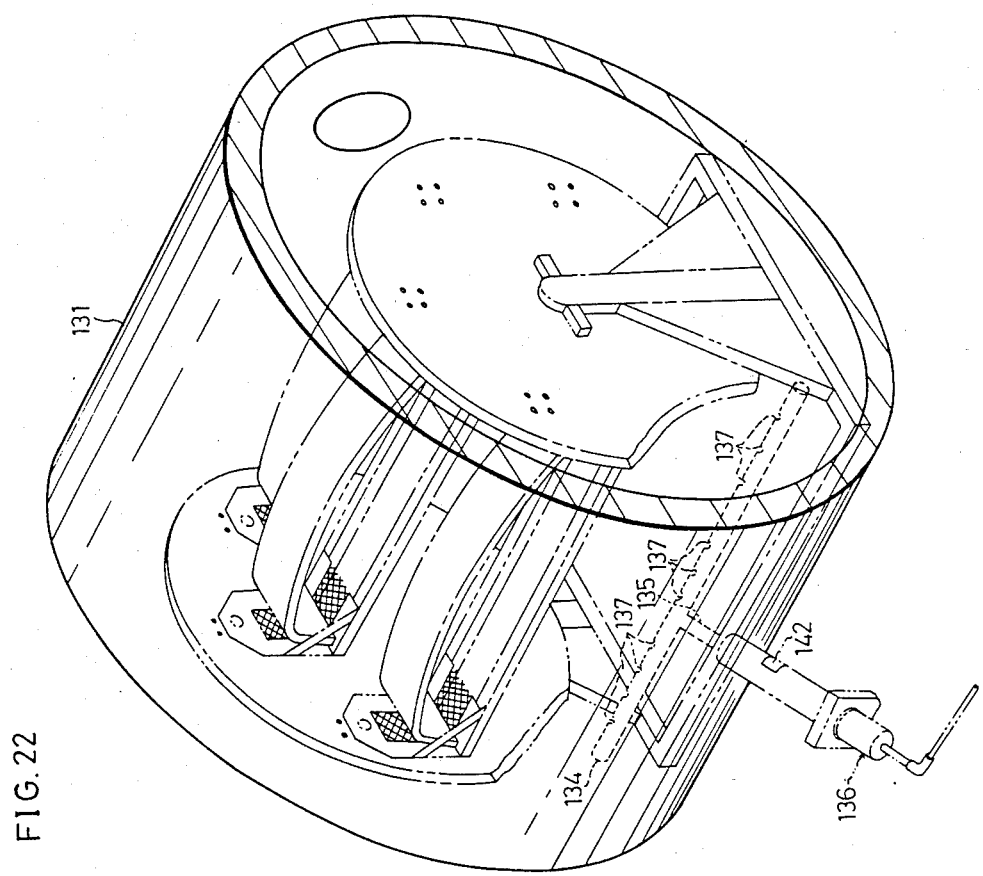
FIG. 22 is a perspective view of a plasma processing apparatus of the fourth embodiment of the present invention.

As shown in FIG. 22, a stainless plasma injection tube 134 for injecting plasma gas such as oxygen is housed in the oblique lower side in the housing chamber 131. An introducing tube 135 is connected almost to the center of plasma injection tube 134 and the other end of the same introducing tube 135 is connected to the plasma generating apparatus 136 at the outside of housing chamber 131. Many injection holes 137 are formed at the external circumference of injection tube 134.

Figure 23:
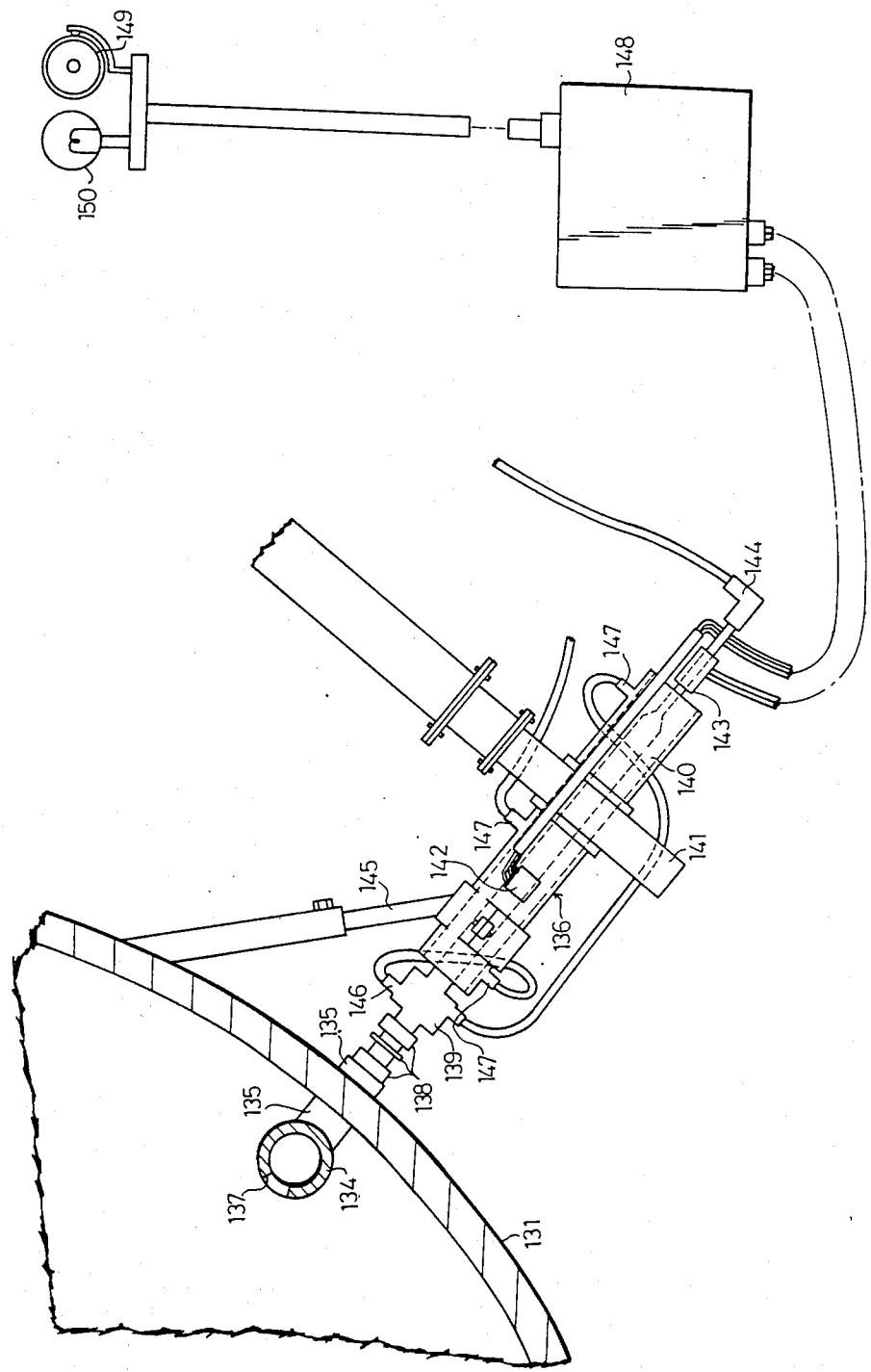
FIG. 23 is a front elevation of a plasma generating apparatus comprising a discharge sensor.

As shown in FIG. 23, said introducing tube 135 protruded to the outside of housing chamber 131 is connected with a joint 138 comprising a core tube consisting of a glass tube and then it is connected with the end part of plasma ganerating apparatus 136 through the same joint 138.

The same apparatus 136 is composed of a plasma generating tube 139, a plasma generating furnace 140, a waveguide 141, a discharge sensor 142, a Tesla coil 143 and a phloro connector 144 and is supported by the housing chamber 131 with a holder 145.

The slender and long plasma generating tube 139 cnsisting of a quartz tube connected to the other end of said joint 138 is supplied with the oxygen gas through the phloro connector 144 described later. This generating tube 139 has a cooling part 146 at a part thereof. The cylindrical plasma generating furnace 140 has a cooling part 147 and is provided in such a way as surrounding the external circumference of said plasma generating tube 139 and cools the heat generated by plasma discharge. A waveguide 141 is also fitted at a right angle to the axial direction in almost the center of the plasma generating furnace 140. A high frequency signal supplied through the waveguide 141 excites oxygen atoms in the plasma generating tube 139 of the plasma generating furnace 140 in order to realize plasma discharge.

A discharge sensor 142 is fitted at the inside of plasma generating furnace 140 and at the outside of plasma generating tube 139 in such a manner as being not influenced by external light. In this embodiment, a cadmium cell (hereinafter referred to as CdS) which senses the light is used. When the discharge sensor 142 receives the plasma discharge light, it changes a resistance value in accordance with the quantity of light received and outputs an electrical signal to a display unit 148 described below.

The display unit 148 is provided with a detecting circuit (not shown) to detect plasma discharge and is also connected with an alarm buzzer 149 and an alarm lamp 150.

The discharge is triggered by generating sparks at the Tesla coil 143 attached at the external circumference of slender tube at the rear part of said plasma generating tube 139 and thereby plasma can be generated easily in the plasma generating tube 139.

In above constitution, generation of plasma discharge at the time of starting the operation of plasma generating apparatus 136 is explained below.

First, oxygen for plasma generation is supplied to the plasma generating tube 139 through the phloro connector 144.

Next, the Tesla coil 143 is caused to generate spark by appling a voltage thereto and a high frequency signal is also applied to the waveguide 141. Thereby, plasma is generated within the plasma generating tube 139. A discharge sensor 142 provided at the inside of plasma generating furnace 140 detects plasma light generated. A resistance value changes in accordance with the quantity of light generated and an electrical signal is generated to the detection circuit.

After measurement of an electrical signal sent from the discharge sensor 142 for the specified period, if the display unit 148 judges that plasma discharge is not generated, it operates the alarm buzzer 149 and alarm lamp 150 connected thereto in order to send the warning to operator and stops supply of voltage to the Tesla coil 143.

Therefore, it is no longer necessary to confirm generating of plasma discharge after making access to the plasma generating apparatus 136 for each start of operation.

In above fourth embodiment, a CdS is used as the discharge sensor 142 which detects lights but other elements such as a photo transistor, photo diode or silicon blue cell (SBC) may be used as the photo sensor.

When plasma is discharged, not only light but also heat, ozone are generated. Therefore, it is also possible to detect plasma discharge by detecting such components as described below.

Figure 24:
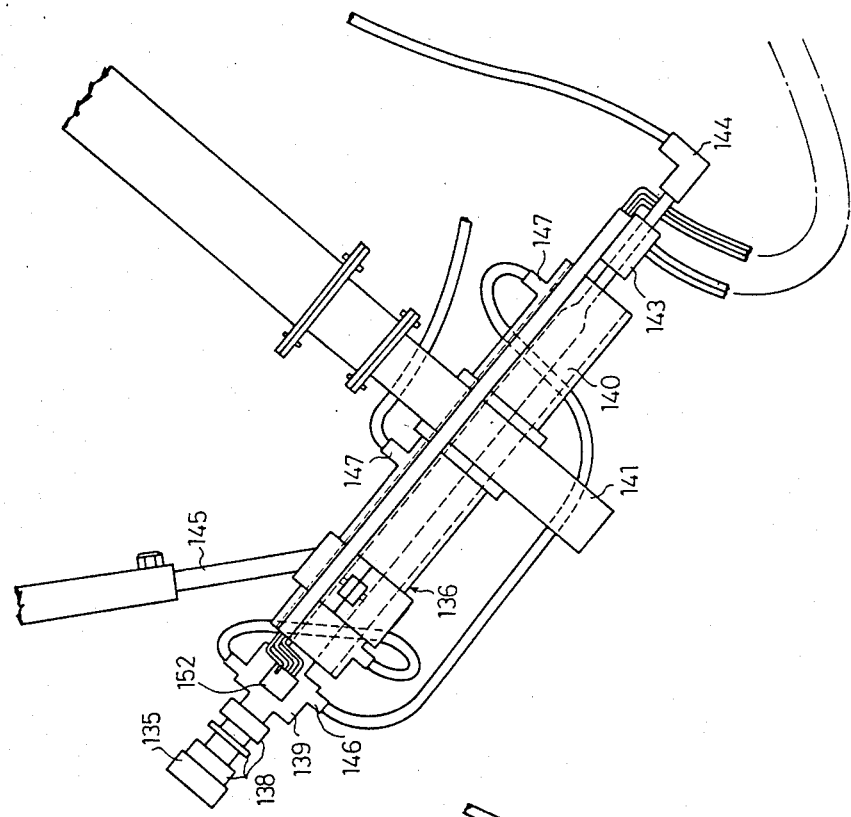
FIG. 24 is a front elevation of a plasma generating apparatus comprising a heat sensor.

(1) As a discharge sensor 142 which detects heat, a thermo sensor 152 such as thermo-couple or thermostat may be attached to the plasma generating tube 139 as shown in FIG. 24.

Figure 25:
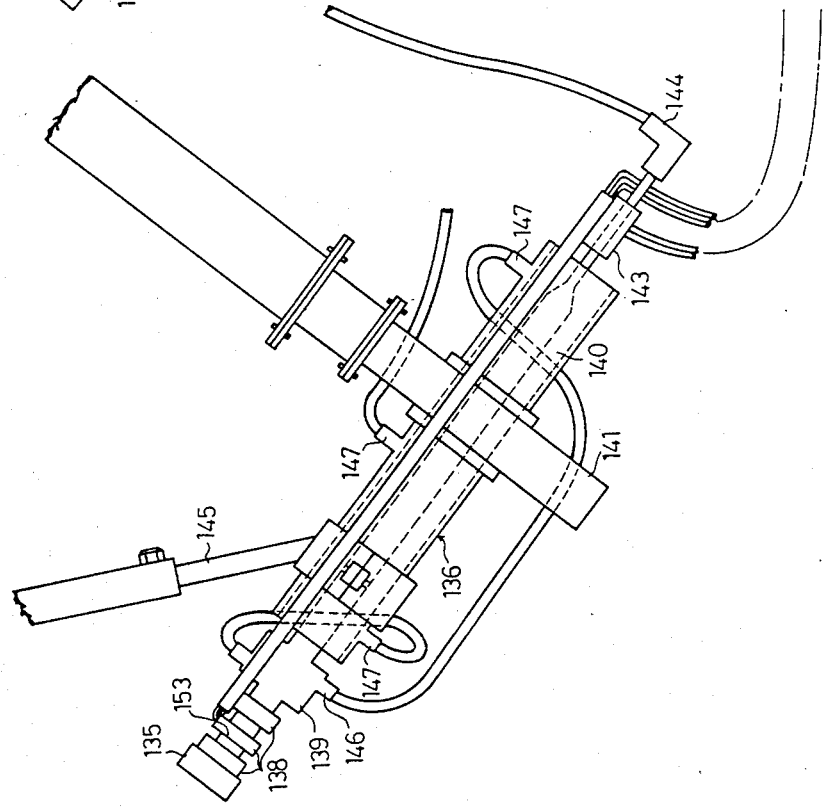
FIG. 25 is a front elevation of a plasma generating apparatus comprising an ozon sensor.

(2) As an ozone sensor 153, for example, a ceramics semiconductor may be used and it may also be attached at the inside of joint 138, for example, as shown in FIG. 25 so that it is placed in contact with the ozone generated.

Next, the fifth embodiment of the present invention will be explained with rerference to FIGS. 26 to 32.

The hermetically sealed housing chamber 201 of plasma processing apparatus is formed like a hollow cylindrical form. A safety valve 203 which prevents abnormal rise of pressure in said housing chamber 201 is provided at the upper left side of external circumference of said housing chamber 201.

A plasma exhaust port 204 which is connected into the housing chamber 201 is provided at the upper right side of such chamber 201 and it is connected to the main valve 206 through a flange 205 of the plasma exhaust port 204. Said main valve 206 is connected with a mechanical booster 208 which vacuums the housing chamber 201 through an exhaust duct 207 with flange. Said mechanical booster 208 is also connected with a rotary pump 209 which also vacuums the housing chamber 201 through the exhaust duct 207.

Figure 30:
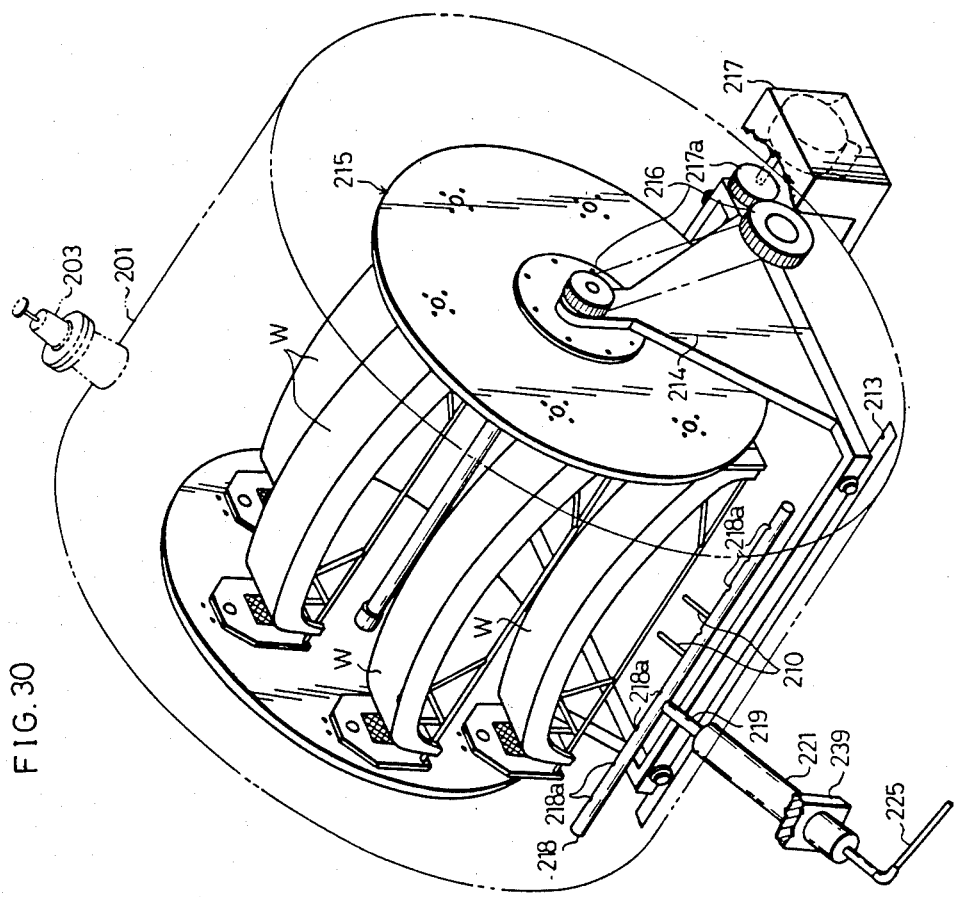
FIG. 30 is a perspective view of the housing chamber of the same embodiment.
Figure 31:
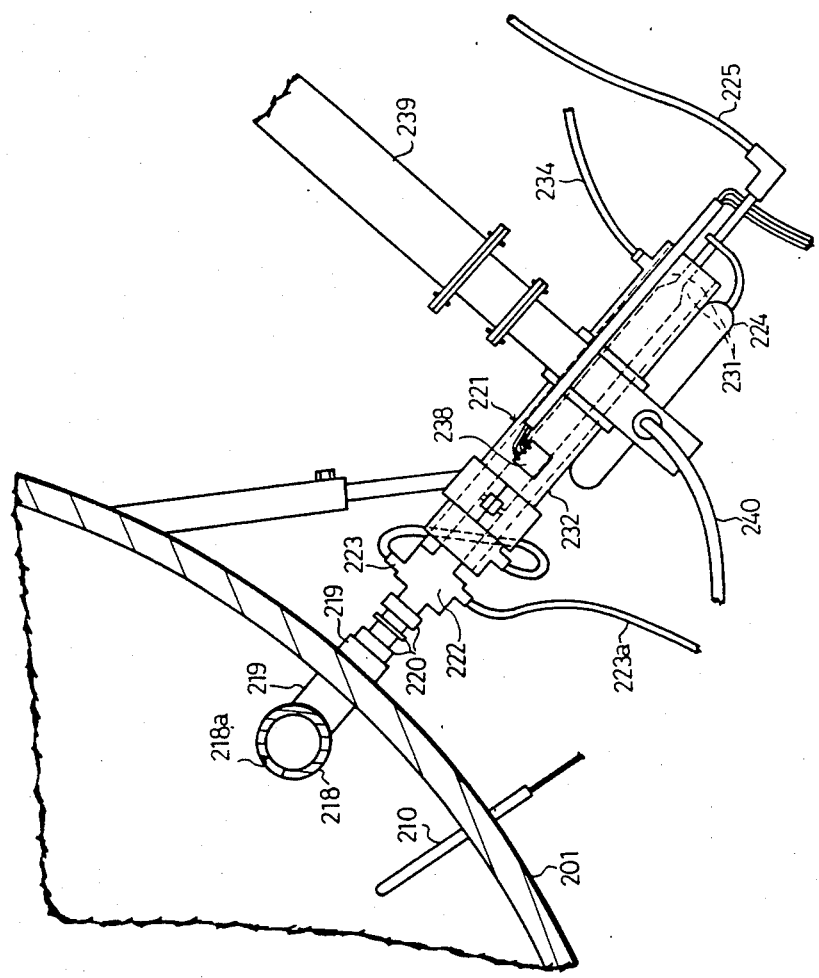
FIG. 31 is an enlarged side elevation of the plasma generating apparatus attached to the housing chamber.

As shown in FIG. 30 and FIG. 31, a pressure sensor 210 is protruded into the housing chamber 201 from the external right side thereof. Said pressure sensor 210 is connected to the control apparatus A provided at the outside of housing chamber 201, relatively controlling said mechanical booster 208, rotary pump 209 and a high frequency oscillator, Tesla coil and electro-magnetic valve, etc. explained later.

Moreover, a pair of parallel rails 213 are provided at the bottom part of housing chamber 201 and the rotating support base 214 is movably set on the same rails 213. The rotating body 215 hanging the substances W to be painted made of synthetic resin and the transmission apparatus 216 which transmits rotation to said rotating body 215 are loaded on said rotating support base 214. Said transmission apparatus 216 is separably engaged with a gear 217a on the drive shaft protruded into the housing chamber 201 from the drive motor 217 loaded at the outside of said housing chamber 201.

As shown in FIG. 31, a stainless plasma injection tube 218 which has many injection holes 218a and injects plasma gas is fixed at the lower right side within the housing chamber 201. At almost the center of said injection tube 218, an introducing tube 219 is connected and this introducing tube 219 is connected with a plasma generating apparatus 221 through a joint 220 from the external side of housing chamber 201.

Figure 26:
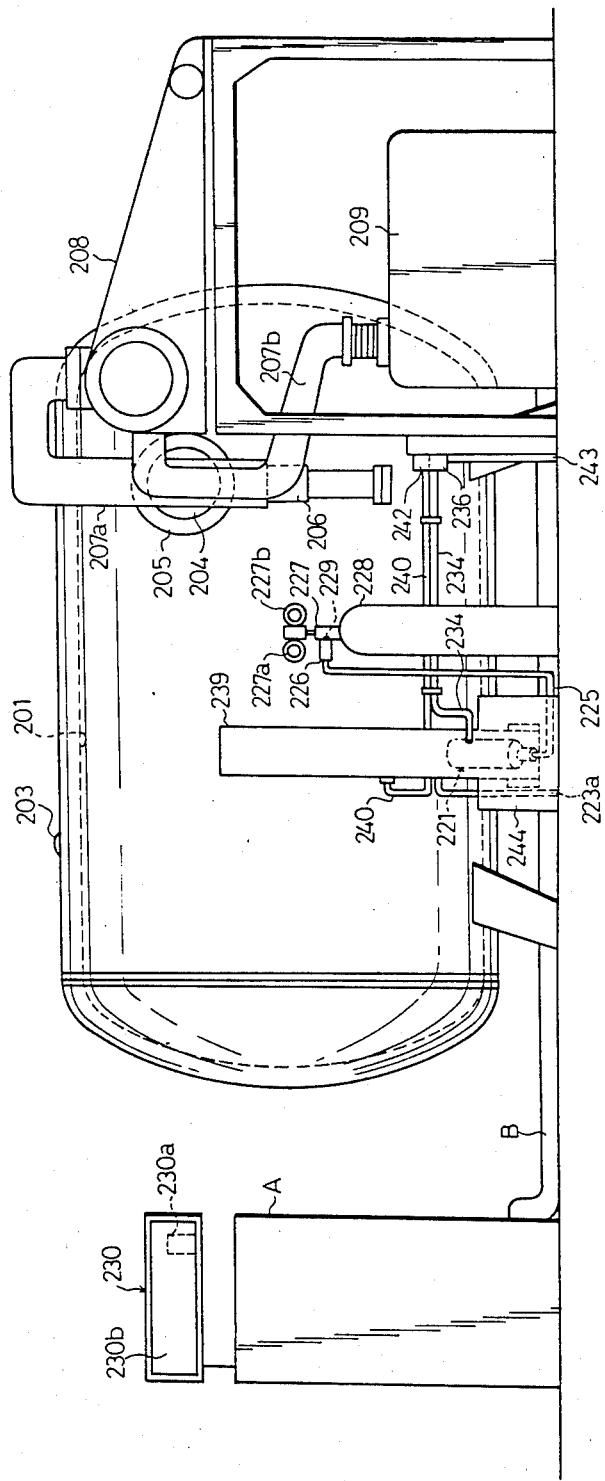
FIG. 26 is a front elevation of the plasma processing apparatus of the fifth embodiment.
Figure 27:
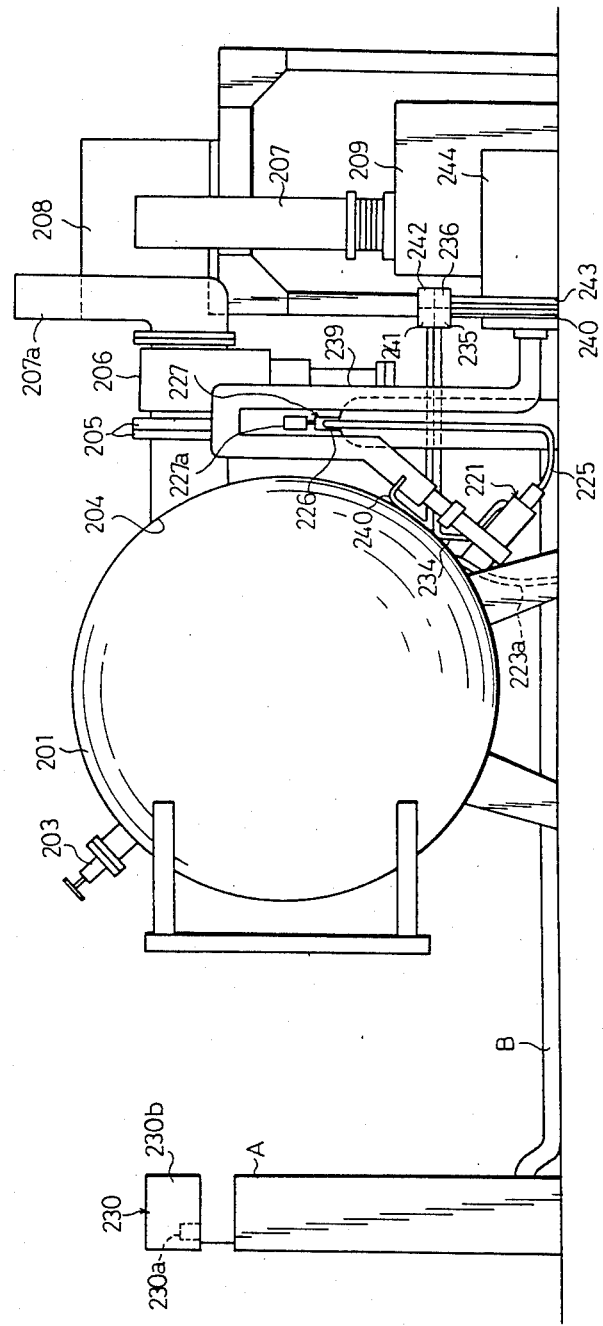
FIG. 27 is the left side elevation of the fifth embodiment.
Figure 28:
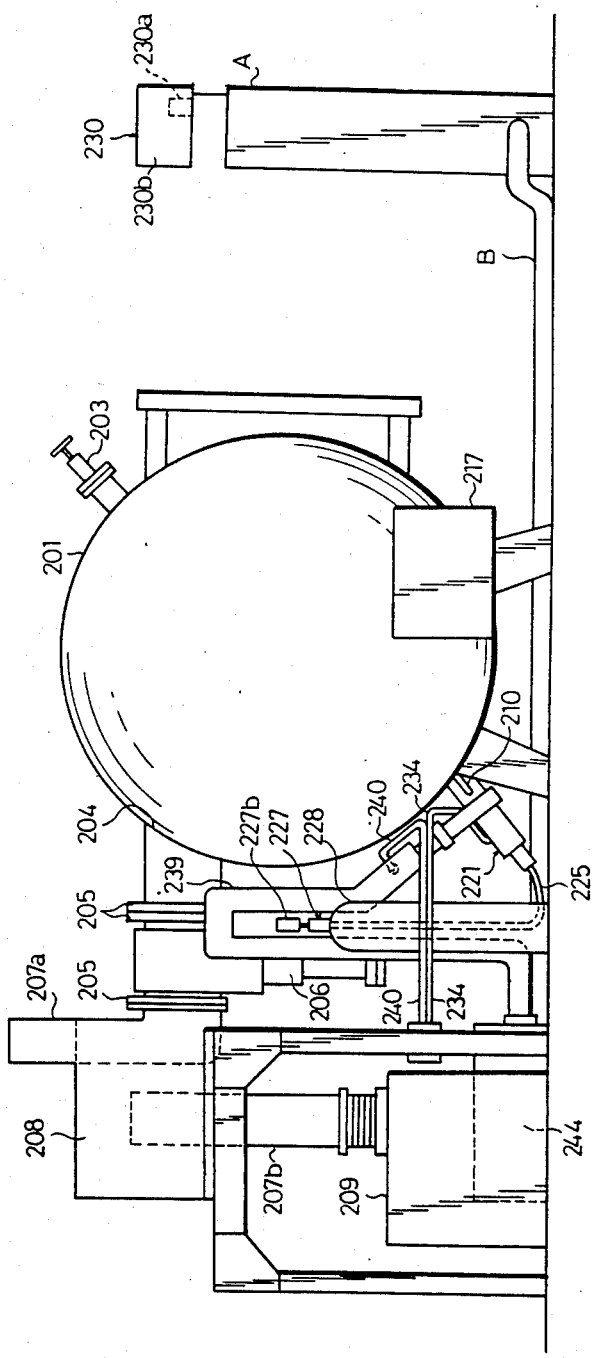
FIG. 28 is the right side elevation of the fifth embodiment.
Figure 29:
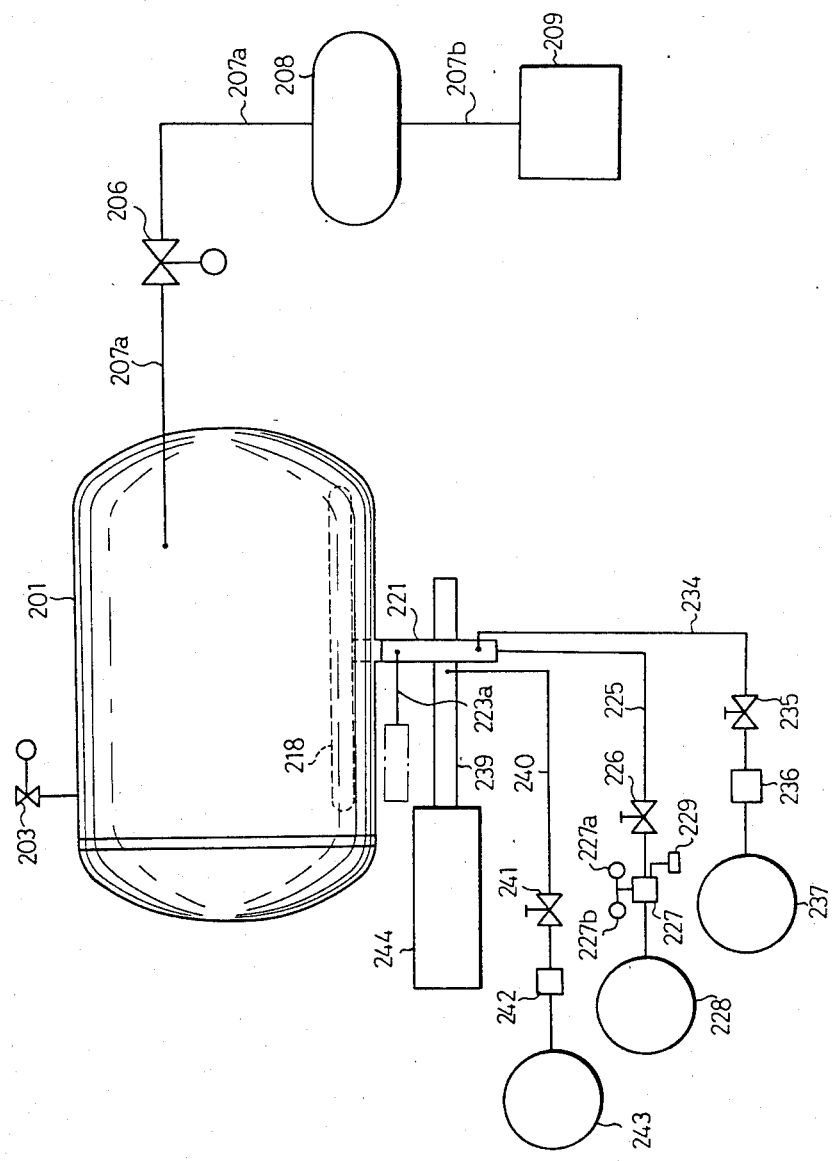
FIG. 29 is a piping diagram of the same embodiment.

The plasma generating apparatus 221 is constituted as explained below. Said joint 220 is connected with a plasma generating tube 222. This plasma generating tube 222 is made of a quartz tube having a cooling part 223 at a part thereof and the rear part is formed as a slender tube with a reduced diameter. A Tesla coil 224 which triggers generation of plasma is provided in parallel to said slender tube. Moreover, at the rear end of slender tube, a hose 225 which supplies raw material gas is connected. In addition, as shown in FIG. 26 and FIG. 29, said hose 225 is connected to an electro-magnetic valve 226 and is then connected to a raw material gas bomb 228 through a contact regulator 227.

The same electro-magnetic valve 226 is controlled by a degree of vacuum in the housing chamber 201, namely by said pressure sensor 210 and control apparatus A.

The contact regulator 227 is provided with a gage 227a which indicates the pressure within said bomb 228 and a gage 227b which indicates a fluid pressure when a raw material gas is exhausted.

This regulator 227 comprises a pressure switch 229 which operates when a pressure within said bomb 228 becomes lower than the specified pressure. When this switch 229 operates, the control apparatus A informs shortage of raw material gas of an operator with an alarm buzzer 230 and a dispay panel 230 provided as an alarm apparatus 30.

In this embodiment, oxygen is used as the raw material gas.

As shown in FIG. 31, an external cylindrical member 232 is loaded around the plasma generating tube 222 through a space 213 with the lower side opened. At the inside of external cylindrical member 232, a cooling part (not shown) is provided and is connected to said cooling part 223. This cooling part 223 is connected with the hose 234 for taking the cooling water.

The other end of said hose 234 is connected to a cooling water supply tube 237 provided in the working chamber through a water failure detector 236 where the electro-magnetic valve 235 detects flow of cooling water. When flow of cooling water is no longer detected, said water failure detector 236 closes said electro-magnetic valve 235.

The cooling water can be collected within a water tank (not shown) using a return hose 223a provided at the cooling part 223 of the plasma generating tube 222 after it is used for cooling the apparatus.

Moreover, a discharge sensor 238 which detects generation of discharge is provided at the internal side of said external cylindrical member 232. Where said discharge sensor 238 can no longer detects plasma discharge, the control apparatus A informs an operator of that the plasma discharge is not generated with the alarm apparatus 230, and stops operation of the plasma processing apparatus.

A waveguide 239 is attached at a right angle to the axial direction at almost the center of exernal cylindrical member 232 and a hose 240 for taking the cooling air is loaded at the lower side thereof. The other end of said hose 240 is coupled to a cooling air supply tube 243 through a sensor 242 where an electro-magnet valve 241 detects stop of cooling air flow. This sensor 242 closes the electro-magnetic valve 241 when it detects that the air is not flowing.

The other end of said waveguide 239 is coupled to a high frequency oscillator 244 and this oscillator 244 supplies a high frequency signal to said plasma generating tube 222. When the high frequency oscillator 244 starts the operation, said Tesla coil 224 forms the spark in synchronization and triggers generation of plasma with high efficiency.

The control apparatus A comprises a timer (not shown) in order to set the plasma processing time and is connected, through the cable B, to said main valve 206, mechanical booster 208, rotary pump 209, drive motor 217, Tesla coil 224, contact regulator 227, alarm apparatus 230 and electro-magnetic valves 226, 235, 241.

This control apparatus A operates said devices with a pressure sensor 210 used as the center device.

First, the plasma processing time is set considering substances to be processed to the timer (not shown) of control apparatus A and the power switch is turned ON.

Figure 32:
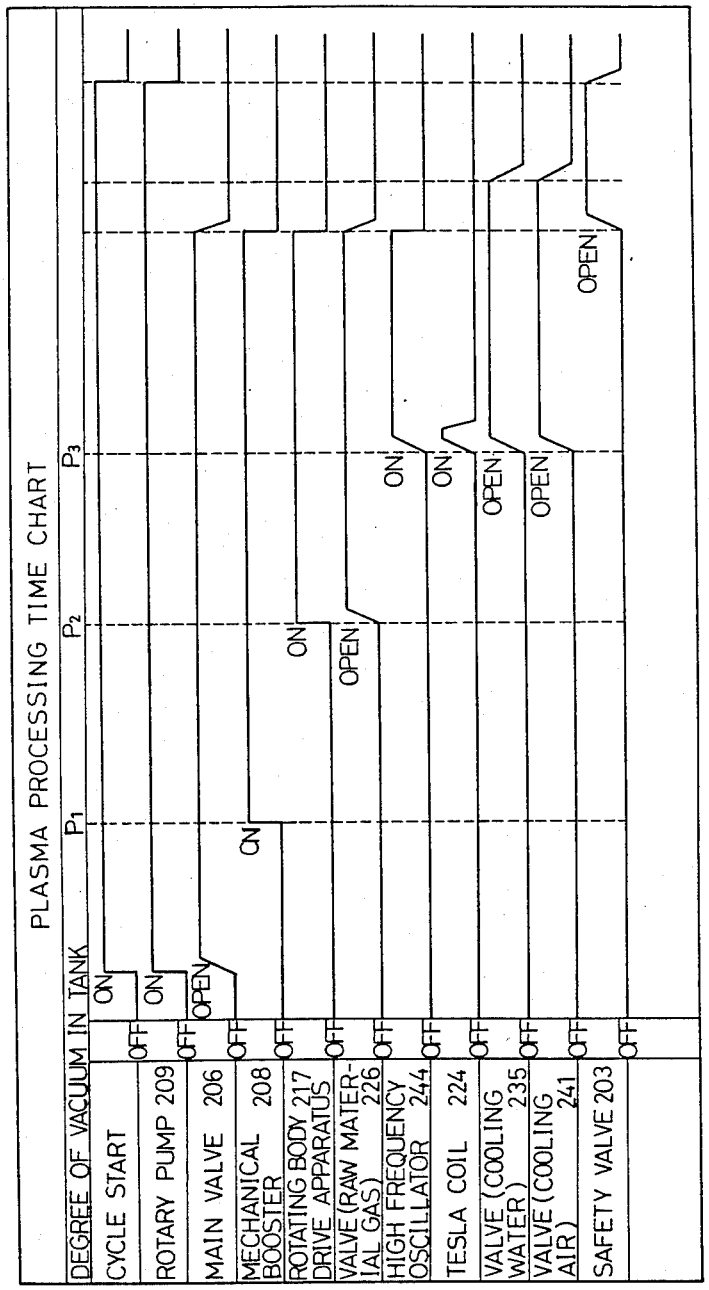
FIG. 32 is a time chart of the plasma generating apparatus.

Thereby, as shown in FIG. 32, the rotary pump 209 operates and the main valve 206 opens after several seconds. The housing chamber 201 is gradually is subjected to reduction in internal pressure and when the degree of vacuum reaches P1, the mechanical booster 208 operates. When the housing chamber 201 is subjected to further reduction in internal pressure and the degree of vacuum reaches P2, the drive motor 217 and rotating body 215 start to rotate and the electro-magnetic valve 226 for supplying raw material gas opens and thereby the raw material gas is supplied to the plasma generating tube 222. When the degree of vacuum in the housing chamber 201 reaches P3, the high frequency oscillator 244, Tesla coil 224 and discharge sensor 238 operate almost simultaneously and the electro-magnetic valves 235 and 241 for cooling water and air are opened, allowing the cooling water and air to flow. Thereby, plasma discharges are generated within the plasma generating tube 222 and the raw material gas plasma can be generated.

The plasma gas thus generated is injected during the preset time of timer from the injection holes 218a of the injection tube 218 to the substances to be painted.

After the specified period, the main valve 206, mechanical booster 208, rotating body 215, operation motor 217, electro-magnetic valve 226 for raw material gas and high frequency oscillator 244 are stopped, except for the rotary pump 209 and a safety valve 203 is opened.

Thereafter, the electro-magnetic valves 235 and 241 of cooling water and air are closed. After the specified time, the safety valve 203 is closed, completing the plasma processing.

If a pressure in the raw material gas bomb 228 is lowered by some reasons (for exmaple, consumption of raw material gas) during the plasma processing even when the specified processing time does not have come, the pressure switch 229 in the contact regulator 227 operates. Thereby, the control apparatus A informs an operator of shortage in the raw material gas with the alarm buzzer 230a and display panel 230b. When the degree of vaccum is further lowered, the electro-magnetic valve 226 closes.

If supply of cooling water or cooling air stops due to water failure or compressor trouble, a water failure detector 236 or detector 242 respectively close the electro-magnetic valves 235 and 241.

When one of aforementioned electro-magnetic valves 226, 235 and 241 closes, the control apparatus A receives a signal from the closed electro-magnetic valve, operating the alarm buzzer 230a and display panel 230b in order to inform an operator of the electro-magnetic valve closed and stops the plasma processing apparatus.

The method for judging whether the substance W to be painted has undergone adequately or not the plasma processing by the plasma processing apparatuses explained with reference to FIGS. 33 to 36.

Figure 35:
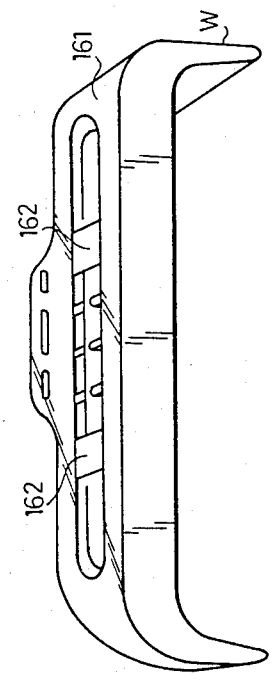
FIG. 35 and FIG. 36 are perspective view and front elevation indicating substance to be painted used for said discrimination.
Figure 36:
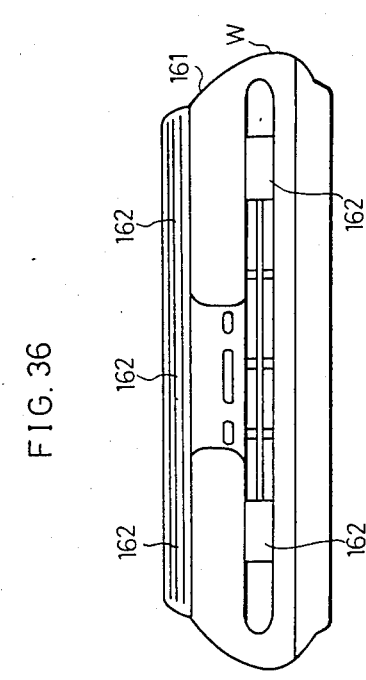

FIG. 35 and FIG. 36 are perspective view and front elevation of a bumper of automobile prepared as the substance W to be painted. The surface of this substance W is subjected to the plasma processing. The substance W is divided to the surface to be painted 161 which may undergo the painting in white and the surface 162 which may not undergo any painting. Both surfaces 161 and 162 are all subjected to the plasma processing.

A plurality of surfaces 162 not painted of said substance W to be painted is coated with the wet coefficient standard liquid 164 and said plasma processing condition can be judged by observing the run-out condition of liquid at the surface 162 not painted.

Here, a method for applying said wet coefficient standard liquid 164 is explained.

Said wet coefficient standard liquid 164 can be obtained by mixing, in the specified ratio, the ethylenegricol monoethylether and holmamide. For example, the standad liquid 164 made by WaKo Pure Chemicals CO. LTD. is used in this embodiment.

In this method, a cotton bar is immersed into the wet coefficient standard liquid 164 and the surface 162 not painted of the substance W to be painted is quickly coated with such liquid. In this case, it is desirable to select the surface 162 not painted from various portions of the substance W in order to detect the activating conditions of the entire part of said substance W and the desirable coating area is about 6 cm².

Figure 33:
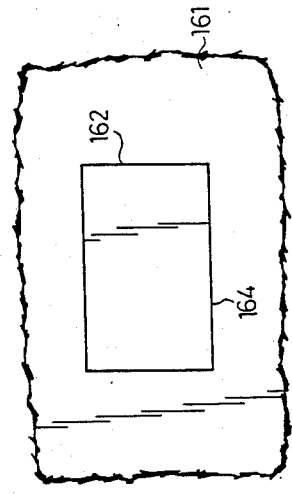
FIGS. 33 and 34 are enlarged views of essential portions indicating the run-out condition of liquid in case the not-painting surface of substance to be painted is coated with the wet index standard liquid which is used for discriminating substance to be painted after the plasma processing.
Figure 34:
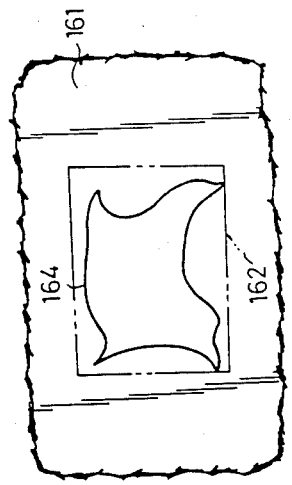

Here, said discriminating method is explained. Namely, said wet coefficient standard liquid 164 is applied to the surface. Two seconds later, it is judged whether run-out of liquid is generating or not at the surface 162 not painted during such two seconds. In case run-out condition of liquid is not generated as shown in FIG. 33, it is discriminated that plasma processing is carried out adequately. When run-out condition of liquid is generated as shown in FIG. 34, it is discriminated to what degree the plasma processing has been carried out by repeatedly applying the wet coefficient standard liquid 164 with different mixing ratio and observing the surface and adequacy of plasma processing is discriminated with the standard liquid having the surface tension of 52 dyne/cm² or more.

Figure 37:
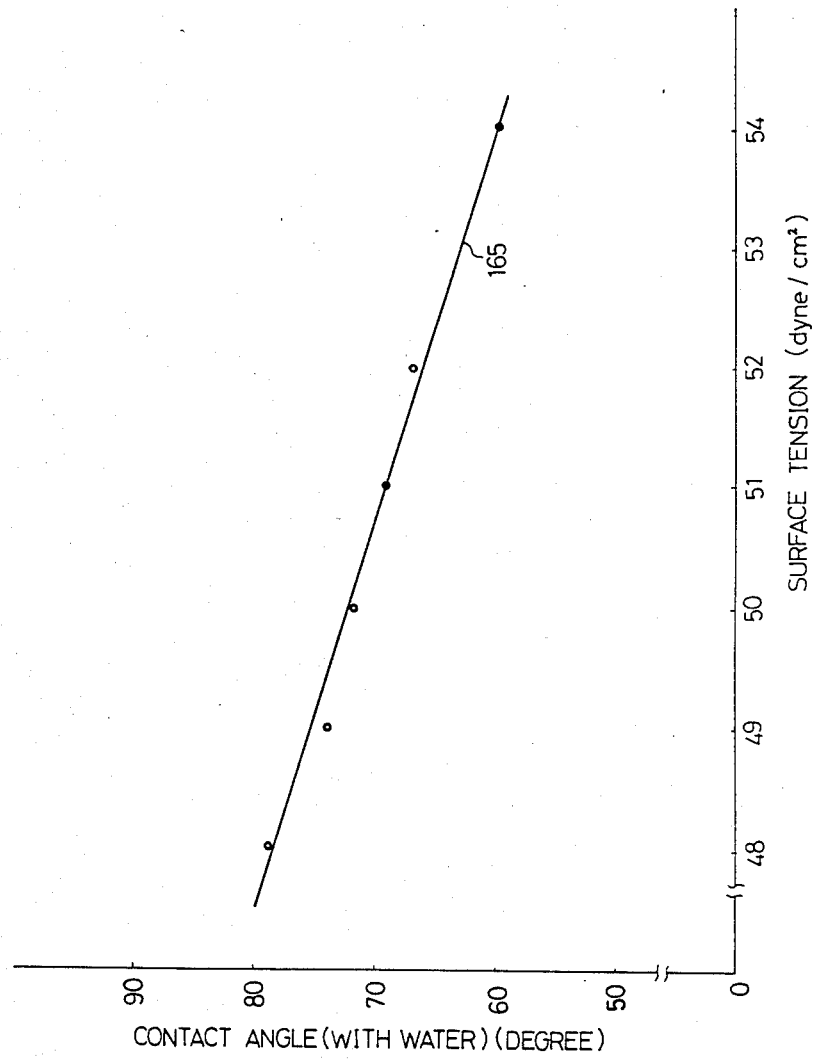
FIG. 37 is a graph indicating correlation between surface tension and contact angle by an index standard liquid of polypropylene resin.

A linear characteristic 165 shown in FIG. 37 shows cor-relation between surface tension and contact angle (with water) by said wet coefficient standard liquid 164 of the polypropylene resin forming the substance W to be painted of the present invention. From this figure, it is known that the effect is appearing in the plasma processing when the surface has the surface tension of 52 dyne/cm² or more. For instance, unprocessed polypropylene resin (CJ944) has the surface tension of 31 dyne/cm² at temperature of 20° C. and humidity of 45%.

Namely, adequacy of plasma processing is discriminated by observing the run-out condition of liquid after 2 seconds from application of wet coefficient standard liquid 164 having surface tension of 52 dyne/cm² or more.

The discrimination method is explained in more detail. Said surface 162 not painted is freely selected in 10 points. When run-out condition of liquid is not generated in every 10 points, it is discriminated that plasma processing has been carried out but if such condition is generated even in a point, it is discriminated that plasma processing is insufficient and substance is sent again to the processing. Table 1 shows liquid composition of standard liquid having surface tension of 52 dyne/cm².

TABLE 1

| Surface tension (dyne/cm²) | Ethylenegricol mono-ethylether (Vol %) | Holmamide (Vol %) |
| --- | --- | --- |
| 52 | 6.3 | 93.7 |
| 54 | 3.5 | 96.5 |
| 56 | 1.0 | 99.0 |

Namely, as explained above, the activating condition of entire surface of substance W to be painted can be discriminated and it may become the guide line of painting characteristic by observing the run-out condition of liquid at the surface 162 not painted and therefore it can be used as the discrimination criterion for application of paint.

As explained above, since activation degree of the surface of substance W to be painted by the plasma processing can be searched in detail respectively for substance W to be painted by the discrimination explained above, quality control of respective product can be realized accurately activation degree can be observed visually through simple processing such as application of standard liquid with a cotton stick. Accordingly, processing efficiency can be raised and it can also be prevented to send unprocessed substances to the next painting process.

Said bumper explained as the substance W to be painted in above discrimination method may naturally be replaced with every kind of nonpolar synthetic resin products which require the painting such as polyethylene, for example, fender, side step, and spoiler, etc.

Since it is obvious that foregoing and other changes in form and details may be made therein without departing from the spirit and scope of the present invention, it is not limited only to particular embodiments, except limitation in the appended claims.

What is claimed is:
1. A plasma processing apparatus comprising,
    (a) a housing chamber accommodating substance to be painted made of synthetic resin,
    (b) a rotating support base which is provided in said housing chamber and made rotatable on an axis to rotate the substance to be painted,
    (c) a plurality of hangers which are provided on said rotating support base and support substance to be painted, and
    (d) at least one plasma injection tube which is provided in the housing chamber and executes plasma processing to the surface of substance to be painted by injecting plasma gas thereto.

2. A plasma processing apparatus according to claim 1, wherein a variable speed drive means is provided to rotate the rotating support base at a speed in accordance with size and a number of said substances.

3. A plasma processing apparatus according to claim 2, wherein the rotating support base can be moved into/from the housing chamber and the rotating support base is connected to a drive means through a pair of gears which may be engaged or separated with/from each other under the condition that these are housed within the housing chamber.

4. A plasma processing apparatus according to claim 3, wherein a drive means is a variable speed motor.

5. A plasma processing apparatus according to claim 1, wherein the rotating support base can be moved into/from the housing chamber, and a truck for carrying the rotating support base which is provided opposingly to the entrance and exit of the housing chamber and a rotating mechanism which is coupled to said rotating support base under the condition that said rotating support base is placed on the surface of said truck and rotates said rotating support base on the occasion of loading and unloading of substances to the hangers are provided.

6. A plasma processing apparatus according to claim 5, wherein the rotating mechanism is composed of worm and worm gear which engage with each other and an operation handle for rotating said worm.

7. A plasma processing apparatus according to claim 5, wherein said truck is positioned opposing to the entrance and exit of housing chamber by a positioning means provided between said truck and housing chamber.

8. A plasma processing apparatus according to claim 7, wherein said positioning means is composed of a pair of positioning plates attached to the housing chamber and engaging roller which can be engaged and separated with/from the section between said positioning plates.

9. A plasma processing apparatus according to claim 5, wherein said truck is resettably locked, opposing to the housing chamber, by a lock means provided between said truck and housing chamber 10. A plasma processing apparatus according to claim 9, wherein said lock means is composed of a pair of lock pawls provided to the housing chamber and movable lock pawls which is attached to the truck and engaged and separated with/from said fixed lock pawls.

11. A plasma processing apparatus according to claim 5, wherein the rotating support base is composed of a support frame which has a plurality of wheels at lower both sides thereof and a rotating body rotatably supported by said support frame and the rails for guiding wheels of said support frame on said housing chamber and truck so that these are coupled.

12. A plasma processing apparatus according to claim 5, wherein the rotating support base is connected to said rotating mechanism through a pair of gears which are engaged and separated with/from each other while it is placed on the truck.

13. A plasma processing apparatus according to claim 5, wherein said rotating support base is separably engaged with an engaging means provided between said base and truck while it is placed on the truck.

14. A plasma processing apparatus according to claim 13, wherein said engaging means is composed of fixed engaging pawls attached to the rotating support base and movable engaging pawls which are attached to the truck and are engaged or separated with/from said fixed engaging pawls.

15. A plasma processing apparatus according to claim 1, wherein said hanger is composed of a pair of opposing support members which are rotatably supported each other by the rotating support base at the upper part, a coupling bar extended at the lower end of both support members and a plurality of support protruding pieces protruded on the coupling bar from the lower side of substance to be painted in such a way as supporting it.

16. A plasma processing apparatus according to claim 15, wherein said rotating support base is composed of a support frame and a rotating body which is rotatably supported by such support frame and has a pair of rotating disks, and the hanger is rotatably supported between both rotating disks of rotating body.

17. A plasma processing apparatus according to claim 1 further comprising, a first exhaust port for reducing internal pressure of the housing chamber.

18. A plasma processing apparatus according to claim 17, wherein a second exhaust port is provided at the position opposing to the plasma injection tube in the housing chamber in order to exhaust and adjust supply gas during irradiation of plasma.

19. A plasma processing apparatus according to claim 18, wherein the second exhaust port has a diameter for balancing amount of supply gas and exhaust speed.

20. A plasma processing apparatus according to claim 18, wherein said second exhaust port has a bypass tube of an exhaust tube connected to said first exhaust port and said bypass tube is provided with a gas flow rate control valve.

21. A plasma processing apparatus according to claim 20, wherein said exhaust tube has a flow rate control valve.

22. A plasma processing apparatus according to claim 21, wherein said second exhaust port is formed at the position separated by 180° from the plasma injection tube.

23. A plasma processing apparatus according to claim 17, wherein the plasma injection tube is formed longer than the length of substance to be painted and many injection holes are formed at the external circumference of the injection tube.

24. A plasma processing apparatus according to claim 23, wherein many injection holes are located at both sides of the center of plasma injection tube in the longitudinal direction, interval of holes is gradually reduced at the area becoming near to the end part of injection tube and an internal diameter increases gradually.

25. A plasma processing apparatus according to claim 24, wherein many injection holes includes those which are opening in such a direction as inclining for the specified angle ($\theta_1$) in the one side along the external surface of injection tube against the vertical plane and those which are opening in such a direction as inclining for the specified angle ($\theta_2$) in the other side and these two kinds of holes are alternately provided.

26. A plasma processing apparatus according to claim 25, said specified angles ($\theta_1$, $\theta_2$) are respectively 25° to 35°.

27. A plasma processing apparatus according to claim 23, wherein a plurality of plasma injection tubes are provided.

28. A plasma processing apparatus according to claim 27, wherein three injection tubes are provided in the housing chamber with equal interval.

29. A plasma processing apparatus according to claim 28, wherein three injection tubes are provided in the housing chamber with interval of 90°.

30. A plasma processing apparatus according to claim 27, wherein each injection tube has such a length as protruding to the outside from both ends of substance at the end parts thereof by about 10% of the total length of substance.

31. A plasma processing apparatus according to claim 1 further comprising, a discharge sensor which is provided at the position where light, heat and ozone are generated with generation of plasma by the plasma generating apparatus, and a display unit connected to said discharge sensor.

32. A plasma processing apparatus according to claim 31, wherein a discharge sensor is a light sensor which detects intensity of light.

33. A plasma processing apparatus according to claim 31, wherein a discharge sensor is a heat sensor which detects temperature rise.

34. A plasma processing apparatus according to claim 31, wherein a discharge sensor is an ozone sensor which detects generation of ozone.

35. A plasma processing apparatus according to claim 1 further comprising, a sensor which is provided at the position where a cooling fluid and raw material gas for plasma processing supplied to the plasma generating apparatus in order to detect under-pressure of raw material gas and/or stop of flow of cooling liquid, a control apparatus which stops operation of plasma processing apparatus in accordance with the detecting operation of said sensor, and an alarm apparatus which informs stop of operation by said control apparatus to an operator.

36. A plasma processing apparatus according to claim 35, wherein a sensor which detects under-pressure of raw material gas is a pressure sensor provided within the housing chamber.

37. A plasma processing apparatus according to claim 35, wherein a cooling fluid is a cooling water which flows in the hose for cooling water and the sensor which detects stop of flow of such cooling water is a water failure detector provided in the course of said hose.

38. A plasma processing apparatus according to claim 35, wherein a cooling fluid is cooling air flowing in the hose for extracting cooling air and a sensor which detects stop of flow of cooling air is a defective air flow detector provided in the course of said hose.

39. A plasma processing apparatus according to claim 35, wherein an alarm apparatus is composed of an alarm buzzer and a display unit.

* * * * *